United States Patent [19]

Berwanger

[11] Patent Number: 5,774,372
[45] Date of Patent: Jun. 30, 1998

[54] PRESSURE PROTECTION MANAGER SYSTEM & APPARATUS

[76] Inventor: Pat Berwanger, 4615 SW. Freeway, Suite 925, Houston, Tex. 77027

[21] Appl. No.: 624,174

[22] Filed: Mar. 29, 1996

[51] Int. Cl.$^6$ ................................................. G01B 17/00
[52] U.S. Cl. .................... 364/551.01; 364/509; 364/510; 364/558; 364/431.01; 137/12
[58] Field of Search ............................. 364/551.01, 509, 364/510, 558, 565, 431.01, 494, 495, 915; 137/12; 376/215, 217, 255

[56] References Cited

U.S. PATENT DOCUMENTS

| | | | |
|---|---|---|---|
| 4,372,334 | 2/1983 | Paul, Jr. ..................................... | 137/12 |
| 4,550,747 | 11/1985 | Woodworth et al. ................. | 137/487.5 |
| 4,893,494 | 1/1990 | Hart ........................................... | 73/4 R |
| 5,001,714 | 3/1991 | Stark et al. . | |
| 5,036,479 | 7/1991 | Prednis et al. . | |
| 5,043,987 | 8/1991 | Stark et al. . | |
| 5,068,814 | 11/1991 | Stark et al. . | |
| 5,099,437 | 3/1992 | Weber . | |
| 5,122,976 | 6/1992 | Bellows et al. . | |
| 5,157,668 | 10/1992 | Buenzli, Jr. et al. . | |
| 5,161,110 | 11/1992 | Dorchak . | |
| 5,210,704 | 5/1993 | Husseiny . | |
| 5,225,996 | 7/1993 | Weber . | |
| 5,253,184 | 10/1993 | Kleinschnitz . | |
| 5,260,883 | 11/1993 | Wilson ................................... | 364/512 |
| 5,293,556 | 3/1994 | Hill et al. . | |
| 5,391,209 | 2/1995 | Pelkey ....................................... | 48/191 |
| 5,442,555 | 8/1995 | Reifman et al. .................... | 364/431.01 |
| 5,461,570 | 10/1995 | Wang et al. . | |
| 5,465,321 | 11/1995 | Smyth . | |
| 5,485,401 | 1/1996 | Cadman ............................. | 364/551.01 |

OTHER PUBLICATIONS

R.A. Kreder and P.C. Berwanger, "*Making Safety Data 'Safe'*," Chemical Engineering, Apr. 1995.

*Primary Examiner*—Emanuel Todd Voeltz
*Assistant Examiner*—Hien Vo
*Attorney, Agent, or Firm*—Liddell, Sapp, Zivley, Hill & LaBoon, L.L.P.

[57] ABSTRACT

The Pressure Protection Manager comprises an apparatus and method for determining and documenting overpressure protection due to causes of overpressure associated with equipment and pressure relief devices used in industries such as, for example, process plants having process fluids. The apparatus is used in association with a computer system having a memory device, a processing device, and a program in communication with the processing device and memory device program, the processing device performing tasks required by the program and the computer system further having input and output devices, the memory device comprises: a relational database structure, the relational database structure comprising an equipment database, a pressure relief devices database, a linker database communicating with the pressure relief devices database and the equipment database, and a causes of overpressure database communicating with the equipment database.

23 Claims, 16 Drawing Sheets

PRESSURE PROTECTION MANAGER SYSTEM & APPARATUS

FIELD OF THE INVENTION

The present invention relates to a system and apparatus for determining and documenting overpressure protection for vulnerable equipment as related to pressure relief systems critical to the safety of process plants. Particularly the system and apparatus may be adapted for use with a computer.

BACKGROUND OF THE INVENTION

This invention is applicable in any process or chemical plant or wherever there is vulnerable equipment or piping systems that may be exposed to possible causes of overpressure in excess of its design pressure and therefore protected by pressure relief devices that provide an outlet to relieve that overpressure. A crucial component of process safety management therefore is accurate monitoring to maintain the integrity of a process plant's pressure relief system, both functionally and mechanically, over the entire life of the plant. The careful design and installation of pressure relief systems has long been a part of plant design and operation. However, until this invention, the same degree of care has not been given to the development of methods to properly document these systems; i.e., a method to ensure that the relief device associated with a piece of equipment is capable of handling the known causes of overpressure associated with that piece of equipment.

Pressure relief systems include pressure relief devices that are sized and structured for a protected unit. A protected unit is one or more pieces of equipment or pipe, or combination of both, which are subject to overpressure, in excess of its design pressure, due to a variety of causes. Such overpressure could result in failure of the unit and potential injury to plant personnel and equipment. Therefore, determining and documenting the correct overpressure protection for equipment and pipes is critical to the safety of process plants. Traditional documentation methods do not lend themselves to maintaining the functional integrity of relief systems.

In most process facilities, the documentation of the pressure-relief system consists of relief valve specification sheets that contains physical data and information on the overpressure scenario for which the device was sized, or nothing, if no relief valves are in place. Overpressure scenarios are directly associated with equipment, however, and exist even if no relief valve is present. Data or specification sheets for relief devices, when available, usually list a single cause of overpressure, or single overpressure scenario, that dictates the size of the relief device. The datasheets do not, however, explicitly state which piece, or pieces, of equipment a relief device is meant to protect. Furthermore, rarely is mention made of all the other causes of overpressure that were considered, but did not influence, the sizing of the relief device. The traditional relief device datasheet does not adequately document the original design process. It is estimated that typical relief device data sheets in use today fail to capture about 75% of the design process, and often do not address changes that take place over time to the plant's design and operations. Data structures previously used for documenting relief systems are often fundamentally flawed because of the failure to associate specific equipment with its possible causes of overpressure.

Databases are an improvement over traditional methods of storing equipment and relief valve datasheets, and are used to maintain all safety information in one place. The safety data can include documents covering pressure relief systems, process and instrumentation diagrams, tests of safety critical devices, mechanical integrity data, and information on safe operating levels. Again this safety information is limited to the information on datasheets originally supplied with the relief system. It is reasonable to assume that the designer of the original relief system, most likely an engineer having expertise on the area, did consider various overpressure scenarios. However, plant engineers, whose skills differ from those of the relief system expert, are not likely to consider all the causes of overpressure each time an operating parameter is changed. This is especially true when no mention is made of multiple overpressure scenarios in the conventional datasheet. Another problem has been failing to link equipment to causes of over pressure to relief devices. Prior computer devices fail to link the equipment with its possible causes of overpressure to the equipment's associated relief device. Thus the device fails to determine if the associated relief device is adequate to provide the required relief rate for the various causes of overpressure.

A typical process plant may have thousands of pieces of equipment or protected units with multiple overpressure scenarios for each piece. A pressure relief device may service one or more pieces of equipment. A typical plant may have thousands of pressure relief devices. Plant safety requires that current and accurate information is available to document that proper pressure relief systems are in place for each piece of equipment subject to overpressure scenarios. Considering the magnitude of data and calculations required, maintaining system integrity can be near impossible using traditional methods of paper or computerized data sheets and manpower.

What is needed is a data structure apparatus and system that explicitly captures the actual relationships between the all of the protected equipment within a plant, the potential causes of overpressure for each piece of equipment, and the relief valves (or other overpressure protective devices) associated with the equipment. What is also needed is a data structure apparatus and system that would then quantify the required relief rates and required relief size of the relief device as well as the actual protection provided by the pressure relief devices for the existing equipment so that the systems expert can determine the adequacy of the pressure relief device for all identified causes of overpressure as well as select new overpressure protection devices for new equipment or changes in process parameters.

Monitoring equipment by use of computerized systems is found in many industries. Wang, in U.S. Pat. No. 5,461,570, discloses a computer control system for monitoring the production line processes used in the manufacture of contact lenses, and further discloses a relational database for storing the process control data, the contact lens data and the inspection data. Weber, in U.S. Pat. Nos. 5,099,437 and 5,225,996 discloses a computerized system for detecting hydrocarbon emissions, and for tracking the history of equipment tested for emissions. Weber's device is a system for identifying various release points, inspecting the release points for emissions tracking repairs and inspections and using a main computer to analyze the data to determine if each release point passed or failed the emissions test or if the severity of the leak requires remedial action. Hill, in U.S. Pat. No. 5,293,556, discloses an apparatus and method for a knowledge based failure management system that is used to monitor failure activity within customer equipment containing a multiplicity of field replaceable units.

None of the above-described devices or methods teach or suggest a data structure apparatus and system required for safety in industries such as, for example process plants that explicitly captures the actual relationships between the protected equipment, the potential causes of overpressure, and the relief valves (or other overpressure protective devices) and then calculates the adequacy of protection for the existing equipment and assists in the selection of new overpressure protection devices for new equipment or changes in process parameters.

SUMMARY OF THE INVENTION

It is apparent that a new apparatus and computerized system for the documentation and analysis of the adequacy of existing or new pressure relief systems is desirable. The pressure protection manager of this invention provides an apparatus for sizing relief systems comprising a computer having a software program stored in its memory device that activates a processor device to perform the required quantification's and calculations of this invention. The software program comprises an interactive relational database management apparatus and system that captures the relationships between the potential causes of overpressure, pieces of equipment, and specific relief devices. The software program of this invention also comprises a relational database structure that allows a user to electronically link a piece of equipment with its associated relief device and vice versa. This systematic approach ensures that a process plant's equipment has adequate overpressure protection.

While previously known relief device documentation systems focused on the pressure relief valve, the pressure protection manager of this invention places the piece of equipment at the heart of its analysis since it is the equipment that is subject to overpressure scenarios. This fundamental difference enables the user to determine that all equipment is afforded adequate pressure protection and that all potential causes of overpressure are captured regardless of whether or not a relief device is used.

It is a primary feature of this invention to provide an apparatus and method that captures the relationships between the pieces of equipment found in a process plant, the potential causes of overpressure associated with each piece of equipment and specific relief devices associated with one or more pieces of equipment.

It is another feature of this invention to provide an apparatus and method that comprises built-in correlations to quantify the required relief rates to relieve each cause of overpressure associated with each piece of equipment and calculate the required relief rates for a large selection of relief scenarios.

It is another feature of this invention to provide an apparatus and method that quantifies the required relief device size for the required relief rate and provides correlations for quantifying the relief capacity of actual relief devices.

It is another feature of this invention to provide an apparatus and method that links each equipment to its respective relief devices and sizes each relief device for applicable relief scenarios.

It is another feature of this invention to provide an apparatus and method that generates data to evaluate global relief systems including relief devices and discharge piping.

To achieve the foregoing features and advantages and in accordance with the purpose of the invention as embodied and broadly described herein, an apparatus and method for determining and documenting overpressure protection due to causes of overpressure associated with equipment and pressure relief devices used in industries such as, for example, process plants having process fluids is provided.

In a preferred embodiment of the invention, the apparatus for determining and documenting overpressure protection due to causes of overpressure associated with equipment and pressure relief devices used in industries, such as, for example, processing plants having process fluids, the apparatus in association with a computer system having a memory device, a processing device, and a program in communication with the processing device and memory device program, the processing device performing tasks required by the program and the computer system further having input and output devices, the apparatus comprises: a relational database structure the relational database structure comprising:

(a) an equipment database, (b) a pressure relief devices database, (c) a linker database communicating with the pressure relief devices database and the equipment database, and (d) a causes of overpressure database communicating with the equipment database.

In another embodiment of this invention, the apparatus for determining and documenting overpressure comprises a pressure relief devices database that communicates with other database devices including a pressure relief valves database device, a rupture disks database device, a tank vents database device and an other devices database device.

In still another embodiment, the apparatus further comprises an identification causes of overpressure database for identifying potential causes of overpressure for each piece of equipment and providing identified data for use in other database further comprising a relational database structure comprising:

(a) the equipment database device linked to the causes of overpressure database device and further linked to linker database device for quantifying the required relief rate for each identified cause of overpressure, (b) the equipment database linked to the linker database, and the linker database linked to the pressure relief devices database for quantifying actual relief capacity for the actual relief devices, (c) the pressure relief devices database, the pressure relief valves database, the rupture disks database, the tank vents database and the other devices database communicate for the purpose of quantifying required relief device size for the required relief rates, In still another embodiment of the apparatus for determining and documenting overpressure protection due to causes of overpressure associated with equipment and pressure relief devices, the processing device further comprises means for instructing the user to evaluate and quantify the adequacy of the pressure relief device.

In another embodiment, the processing device further comprises means for quantifying and evaluating global scenarios and release from individual pressure relief devices as associated with discharge piping and relief headers.

A preferred embodiment of this invention is a method for determining and documenting overpressure protection due to causes of overpressure associated with equipment and pressure relief devices used in industries such as, for example, process plants having process fluids, the method comprising the steps of:

(1) identifying all potential causes of overpressure for each piece of equipment, (2) quantifying the required relief rate for each identified cause of overpressure, (3) quantifying and evaluating adequacy of pressure relief device, and (4) identifying and evaluating global scenarios and release from individual pressure relief devices as associated with discharge piping and relief headers.

In another embodiment of the method for determining and documenting overpressure protection due to causes of overpressure associated with equipment and pressure relief devices used in industries such as, for example, process plants having process fluids, the method comprises the steps of:

(1) identifying all potential causes of overpressure for each piece of equipment, (2) quantifying the required relief rate for each identified cause of overpressure, (3) quantifying and evaluating adequacy of pressure relief device comprising the steps of:
  (a) quantifying actual relief capacity for the actual relief devices,
  (b) quantifying required relief device size for the required relief rates,
  (c) evaluating and quantifying the adequacy of pressure relief device, and (4) identifying and evaluating global scenarios and release from individual pressure relief devices as associated with discharge piping and relief headers.

In still another embodiment of the method for determining and documenting overpressure protection the pressure relief device is a pressure safety valve. In another embodiment the method for determining and documenting overpressure protection the pressure relief device is a rupture disk.

In still another embodiment of the method the pressure relief device is a vent.

In another embociment of the method for determining and documenting overpressure protection the pressure relief device is any other device functioning as a pressure relief device.

In another embodiment of the method the step of identifying all potential causes of overpressure comprises the steps of:
  (a) defining the causes of overpressure,
  (b) defining the associated relief devices, and
  (c) defining the relevant data needs to determine the required relief rates.

In a preferred embodiment of the method each relief device is defined comprising the steps of:
  (a) determining whether the relief device is a pressure safety valve, and if so, the pressure safety valve is defined comprising the steps of:
    (1) defining the device specifications for the pressure safety valve, if any,
    (2) defining the testing requirements for the pressure safety valve, if any,
    (3) defining the material selection requirements for the pressure safety valve, if any,
    (4) defining supplier information for the pressure safety valve, if any, and
    (5) defining the inlet and outlet connections and piping data for the pressure safety valve, if any,
  (b) determining whether the relief device is a rupture disk, and if so, the rupture disk is defined comprising the steps of:
    (1) defining the device specifications for the rupture disk, if any,
    (2) defining the testing requirements for the rupture disk, if any,
    (3) defining the material selection requirements for the rupture disk, if any,
    (4) defining supplier information for the rupture disk, if any, and
    (5) defining the inlet and outlet connections and piping data for the rupture disk, if any,
  (c) determining whether the relief device is a vent, and if so, the vent is defined comprising the steps of:
    (1) defining the device specifications for the vent, if any,
    (2) defining the testing requirements for the vent, if any,
    (3) defining the material selection requirements for the vent, if any,
    (4) defining supplier information for the vent, if any, and
    (5) defining the inlet and outlet connections and piping data for the vent, if any,
  (d) determining whether the relief device is another device, and if so, the other relief device is defined comprising the steps of:
    (1) defining the device specifications for the other relief device, if any,
    (2) defining the testing requirements for the other relief device, if any,
    (3) defining the material selection requirements for the other relief device, if any,
    (4) defining supplier information for the other relief device, if any, and
    (5) defining the inlet and outlet connections and piping data for the other relief device, if any.

In another preferred method for determining and documenting overpressure protection the step of quantifying the required relief rate for each identified cause of overpressure comprises the step of defining the physical properties of the process fluids contained in the equipment including fluid type, physical properties at relief pressure, heat of vaporization, vapor molecular weight, vapor density and liquid density.

In a preferred embodiment of this invention for determining and documenting overpressure protection due to causes of overpressure associated with equipment and pressure relief devices used in industries such as, for example, process plants having process fluids using a computer system the method comprises the steps of:

(a) defining each piece of process plant equipment in the equipment database, (b) defining the causes of overpressure for each piece of equipment in the identification of causes of overpressure database and linking to equipment database, (c) defining the relief device in the pressure relief devices database, (d) quantifying required relief device for each piece of equipment for each cause of overpressure in the causes of overpressure database, (e) linking each piece of equipment defined in the equipment database to its respective relief devices defined in the pressure relief devices database, (f) sizing each relief device for applicable relief scenarios, and (g) evaluating entire relief system including pressure relief devices and discharge piping.

In still another preferred method of this invention, the method comprises the steps of:

(a) selecting a piece of equipment associated with the causes of overpressure, (b) defining equipment information, (c) identifying applicable causes of overpressure for a particular piece of equipment, (d) quantifying a required relief rate, (e) choosing the appropriate sizing equations for particular piece of equipment, (f) entering physical property data, as needed, (g) calculating required relief rate, (h) selecting relief devices, (i) selecting a piece of equipment, (j) evaluating pressure relief device requirements, (k) identifying global scenarios, (l) quantifying global scenarios, (m) calculating back pressure and velocity for global scenarios, and (n) validating device performance.

In another embodiment of the method for determining and documenting overpressure protection, the step of evaluating pressure relief device requirements comprises the steps of:

(a) evaluating whether the pressure relief device requires non-standard sizing, and if so, using the manufacturer's equations, and if not, using data for required relief rate, (b) quantifying the actual relief rate capacity and the required pressure relief device size, and (c) quantifying pressure drop across pressure relief device, if required.

A preferred method for determining and documenting overpressure protection comprises the steps of:

(a) identifying all potential causes of overpressure for each piece of equipment, (b) quantifying a required relief rate for each identified cause of overpressure, (c) defining operating pressure and set pressure associated with relief device, (d) defining constant and built-up back pressure, (e) defining predetermined blowdown, (f) selecting discharge destination and predesignated design code, (g) selecting allowable overpressure for rate that the relief device is being sized, (h) determining if the fluid is a stream, (i) defining required flow rate and cause of overpressure units for pressure relief device being sized, (j) determining nonstandard sizing requirements, (k) determining if pressure relief device goes to flare, and (l) verifying adequacy of existing pressure relief devices.

Another preferred method for determining and documenting overpressure protection, the step of determining nonstandard sizing requirements comprises the steps of:

(a) evaluating that nonstandard sizing is not required, and (b) using manufactureis equations concerning orifice area and actual flow.

A preferred method for determining and documenting overpressure protection the step of determining nonstandard sizing requirements comprises the steps of:

(a) evaluating that nonstandard sizing is required, (b) if fluid is two-phase or flashing, using Design Institute For Emergency Release Systems or American Petroleum Institute method of calculating flow, and thereafter quantifying actual capacity and required pressure relief device size, (c) if fluid is not two-phase or flashing, quantifying actual capacity and required pressure relief device size, (d) entering actual orifice area or corresponding size, (e) entering physical property data, if needed, (f) calculating required pressure relief device size, (g) calculating actual capacity of pressure relief device, (h) if a pressure drop across valve exists, implement the steps,
  (1) defining inlet and outlet information,
  (2) calculating pressure drop at inlet and outlet, (i) if relief valve and goes to flare, implement the step of defining the fluid characteristics, and (j) verifying adequacy of existing pressure relief devices.

In another preferrred method for determining and documenting overpressure protection, the step of determining if the fluid is a steam comprises the steps of:

(a) determining that the fluid is a steam, (b) entering the steam information, (c) defining required flow rate and cause of overpressure units for pressure relief device being sized, (d) determining nonstandard sizing requirements, (e) determining if relief valve goes to flare, and (f) verifying adequacy of existing pressure relief devices.

In another preferred embodiment of the method for determining and documenting overpressure protection, the step of determining if the fluid is steam comprises the steps of:

(a) determining that the fluid is not steam, (b) entering the description of the fluid, (c) entering the actual mass percent vapor, (d) if the fluid is 100% liquid, implementing the following steps,
  (1) entering liquid gravity, liquid viscosity, temperature and vapor pressure at relief pressure,
  (2) defining required flow rate and cause of overpressure units for pressure relief device being sized,
  (3) determining nonstandard sizing requirements,
  (4) determining if relief valve goes to flare, and
  (5) verifying adequacy of existing pressure relief devices, (e) if the fluid is not 100% liquid, implementing the following steps,
  (1) if the fluid is not 100% vapor, implementing the following steps,
    (A) entering vapor molecular weight, vapor compressibility, vapor specific heat ration and temperature at relief pressure,
    (B) defining required flow rate and cause of overpressure units for pressure relief device being sized,
    (C) determining nonstandard sizing requirements,
    (D) determining if relief valve goes to flare, and
    (E) verifying adequacy of existing pressure relief devices,
  (2) if the fluid is 100% vapor, implementing the following steps,
    (A) entering vapor molecular weight vapor compressibility, vapor specific heat ration, liquid gravity, liquid viscosity, temperature and vapor pressure of liquid at relief pressure,
    (B) defining required flow rate and cause of overpressure units for pressure relief device being sized,
    (C) determining nonstandard sizing requirements,
    (D) determining if relief valve goes to flare, and
    (E) verifying adequacy of existing pressure relief devices.

DETAILED DESCRIPTION OF THE PREFERRED EMBODIMENTS

Figure 1A:
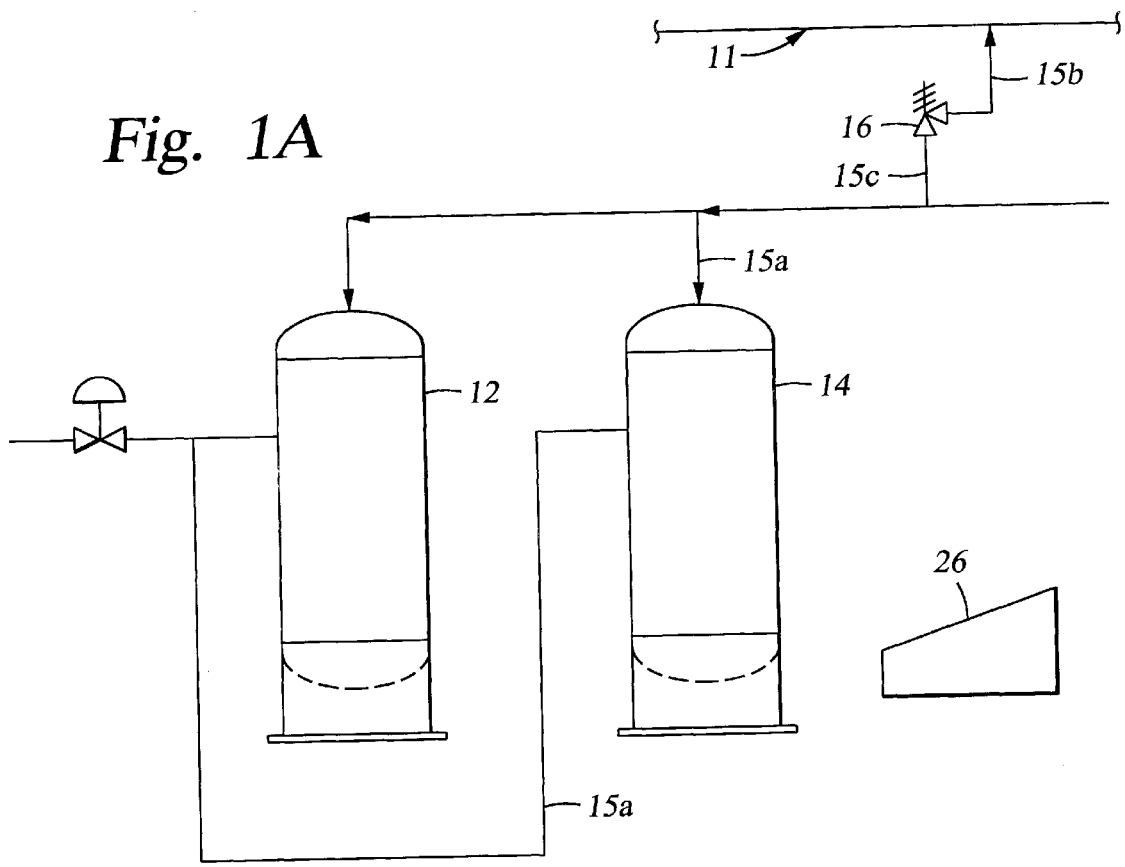
FIG. 1a is a schematic representation illustrating the interrelationship between multiple pieces of equipment protected by a single relief device in accordance with this invention.
Figure 1B:
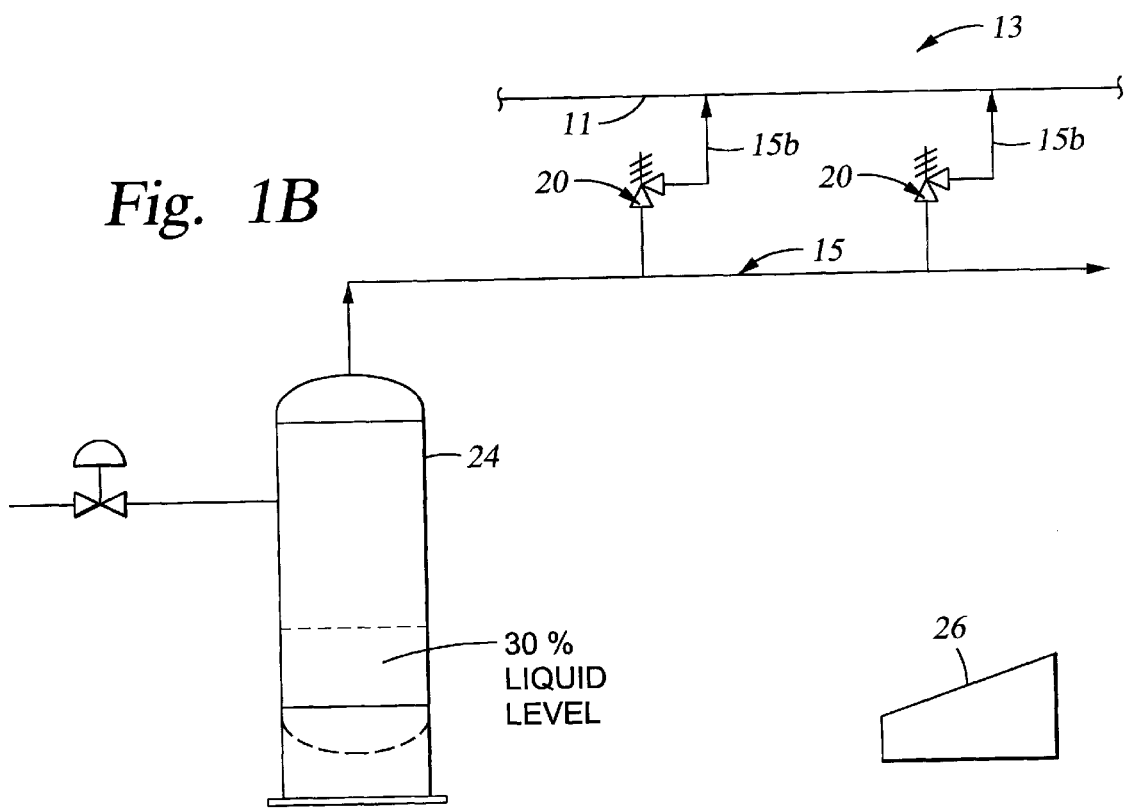
FIG. 1b is a schematic representation illustrating the interrelationship between a single piece of equipment protected by multiple relief devices in accordance with this invention.

Reference will now be made in detail to the present preferred embodiments of the invention as depicted in the accompanying drawings. The Pressure Protection Manager (PPM) is a method and apparatus of monitoring the integrity of a process plant's pressure relief system. FIG. 1a is a schematic representation of a single relief valve 16 protecting two pieces of process plant equipment 12, 14. Relief systems also comprise piping network 13 and relief headers 11. The piping network 13 comprises piping between the equipment 12, 14 and the relief device 16 and discharge piping 15 which combine release from multiple relief devices FIG. 1b 20, 22. Data relating to equipment and relief systems is input into computer, 26 either on or off plant site. FIG. 1b is a schematic representation of multiple relief valves 20, 22 protecting a single piece of equipment 24. Common scenarios in a process plant allow for multiple pieces of equipment to be protected by one or more relief devices and vice versa. The relational database structure stored in the memory device of a digital computer 26 associated with this invention allows the user to electronically link the data for each piece of equipment 12, 14 having one or more causes of overpressure to the data for the equipment's associated relief device(s). The causes of overpressure are first identified by a systems expert for each piece of equipment 12, 14 located within the process plant. These causes of overpressure are accessed from a database stored in the memory device of the computer 26, the memory or data storage device may comprise any memory or data storage device presently known to those skilled in the art or future memory or data storage devices. Examples include but are not limited to memory devices such as the memory device on a computer's hard drive or a memory storage device such as a floppy disk. Because this invention links the data for each piece of equipment 12, 14 and its causes of overpressure to the data for the equipment's associated relief device, the user may then evaluate the resulting data generated by the computer processing device and thereby systematically determine that all pieces of equipment 12, 14, 24 have adequate overpressure protection. Computer systems including central processing units (or processing devices), memory or storage devices, and input, output devices are well known to one skilled in the art and are being improved constantly. A skilled expert will be able to select the computer systems to carry out the described embodiments of this invention.

Figure 2:
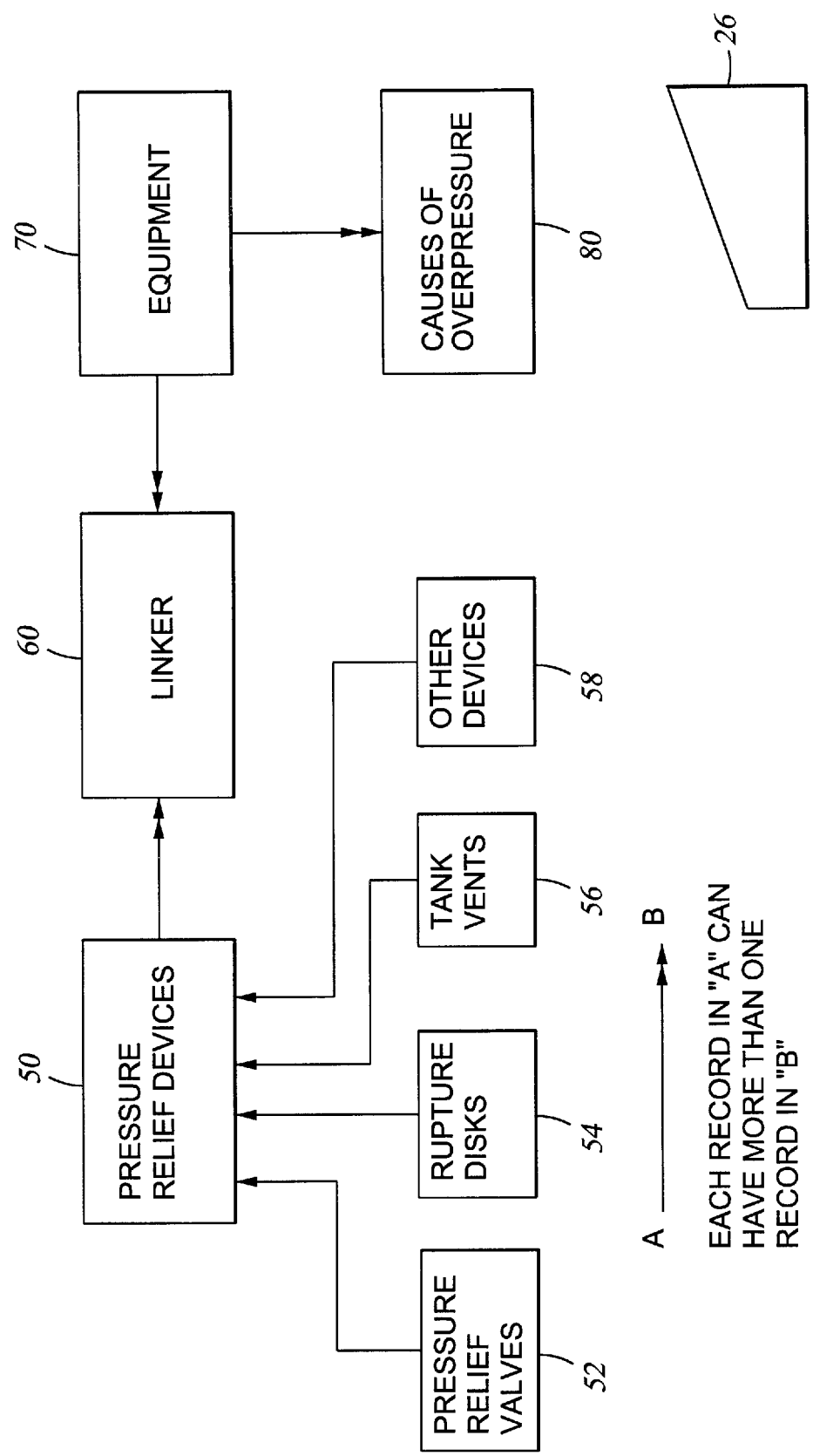
FIG. 2 is a flow diagram illustrating the linking of the relational databases of this invention.

FIG. 2 depicts the various databases stored in the memory device of the PPM. The equipment database 70 stores records for each piece of equipment. Each record in the causes of overpressure database 80 represents a single overpressure scenario for a single piece of equipment. The processor device of this invention automatically adds a new record to this database 80 when the user selects an additional cause of overpressure to add to the record in the equipment database 70. The processor device may be the central processing unit of a computer or any device now known or known in the future to those skilled in the art. The user prompts the processor device to capture data stored within the equipment database 70 and the specific pressure relief devices databases, the pressure relief valve database 52, the rupture disks database 54, the tank vents database 56 and the other devices database 58. For example, to the linker database 60 and pressure relief device database 50. In this way the data stored in the linker database 60 and pressure relief devices database 50 may be accessed by the user thereby linking the data on the equipment to the data on the pressure relief devices; this comprises the relational data base structure of this invention. In this embodiment of the invention the linking occurs when the user accesses the relational data base structure stored in the computer. In other embodiments, the database structure may be comprised of flat databases. The processor device adds a new record to the pressure relief database 50 stored in the memory device each time the user selects a pressure relief device from one of the following: pressure relief valve database 52, the rupture disks database 54, the tank vents database 56 or the other devices database 58. An additional database, not shown, is a cause of overpressure identification database that is used for documentary purposes. This database is not linked to the other databases. It identifies and creates a record of the causes of overpressure associated with each piece of process plant equipment.

Figure 3:
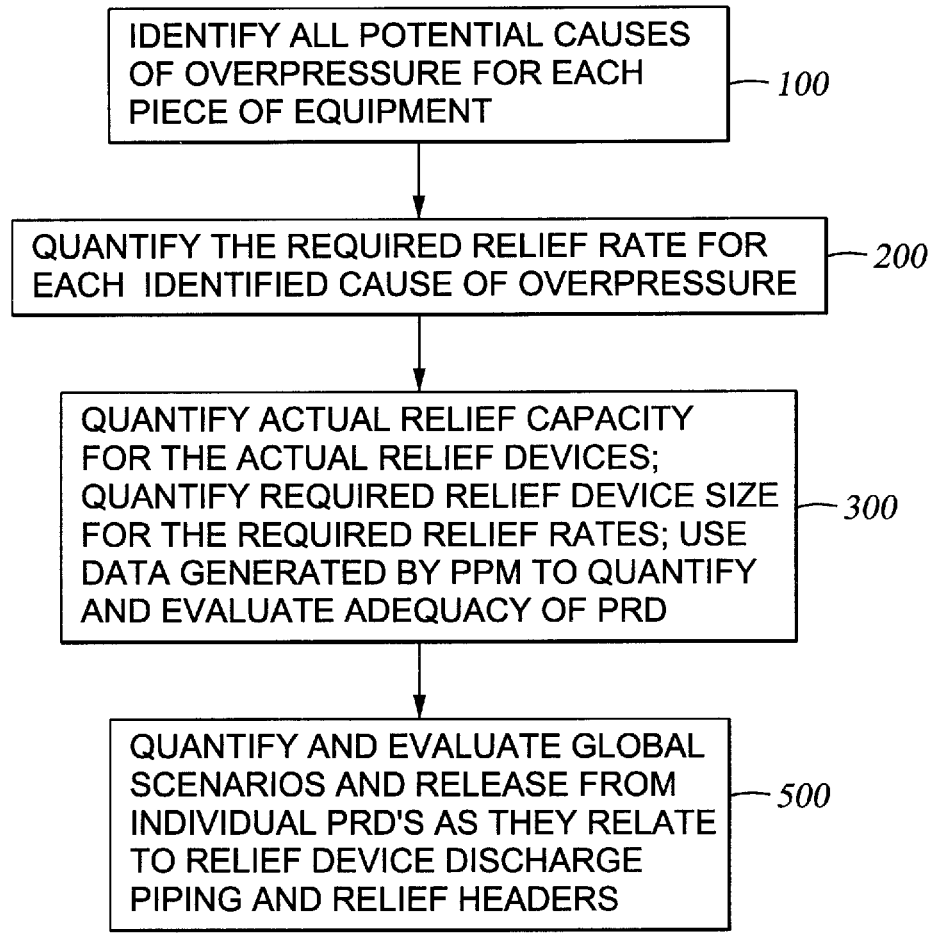
FIG. 3 is a flow diagram depicting the methodology of the PPM for evaluating relief devices and applicable relief overpressure scenarios.

FIG. 3 depicts an overview of the methodology of this invention that enables the user to determine the adequacy of the plant's relief system to handle each of the causes of overpressure associated with the plant's equipment. The steps of the method of this invention do not have to be performed in the order described below. In one embodiment, a systems expert first identifies all potential causes of overpressure which must be taken into account when determining the adequacy of the overpressure protection for a specific piece of equipment. The causes of overpressure database, not shown, is accessed for this data. The PPM provides correlations and checklists for quantifying and calculating required relief rates for most standard causes of overpressure encounted in typical process plant facilities as well as a procedure for adding additional unforeseen causes of overpressure to the database structure. Typical causes of overpressure included in PPM databases are:

external fire—on vertical, horizontal, and spherical vessels—including provision for liquid full, gas full, or partially liquid full conditions.

heat exchanger tube rupture—for liquid, vapor, or two-phase releases.

blocked discharge on reciprocating compressors—taking into account volumetric efficiencies and clearance volumes.

control valve failure—including built-in correlations for flow coefficients in vapor, liquid or two phase service.

overhead condenser failure—based on an overall energy balance for the column.

thermal expansion—including two methods to quantify the cubical expansion coefficient.

API 2000 tank venting requirements—including inbreathing, outbreathing, and emergency venting requirements.

volatile material enters a hot reservoir—including heat required to vaporize volatile and total heat available in hot reservoir calculations.

hot material enters volatile reservoir—including liquid, two phase, and vapor hot materials.

blocked outlet—including documentation of the pressure source.

The systems expert identifies potential causes of overpressure for each piece of equipment FIG. 3, 100 and identifies all relief devices associated with that piece of equipment. The system expert should be an engineer or person who is very knowledgeable regarding the plant equipment and relief systems. The systems expert documents the specific causes of overpressure and relief devices in the cause of overpressure database creating a record for each piece of equipment. A non-expert user may input the actual data into the computer memory with information provided by the systems expert.

The user then accesses the equipment database 70 and proceeds to quantify the required relief rate for each identified cause of overpressure 200. Causes of overpressure are associated with the equipment 12, 14, 24, not the relief devices 16, 20, 22. Even if there are no relief devices, causes of overpressure exist but there are no causes of overpressure if there is no equipment or associated piping. After the required relief rate for each cause of overpressure is quantified 200, the user quantifies the actual relief capacity of the actual relief devices associated with that specific piece of equipment, quantifies the required relief device size for the required relief rates determined in the prior step 200 and then compares the required relief rates and relief size to the actual relief rates and relief size thereby using the data generated by the PPM to quantify and evaluate the adequacy of the pressure relief device 300.

Finally the user quantifies and evaluates the global scenarios and releases from individual pressure release devices as they relate to relief device discharge piping and relief headers 500. The global scenarios 500 take into account an overpressure event that involves the release of fluids (liquid or gaseous) from more than one piece of equipment. Relief headers include the pressure relief devices and discharge piping which serve to combine releases from multiple releif devices.

Figure 4:
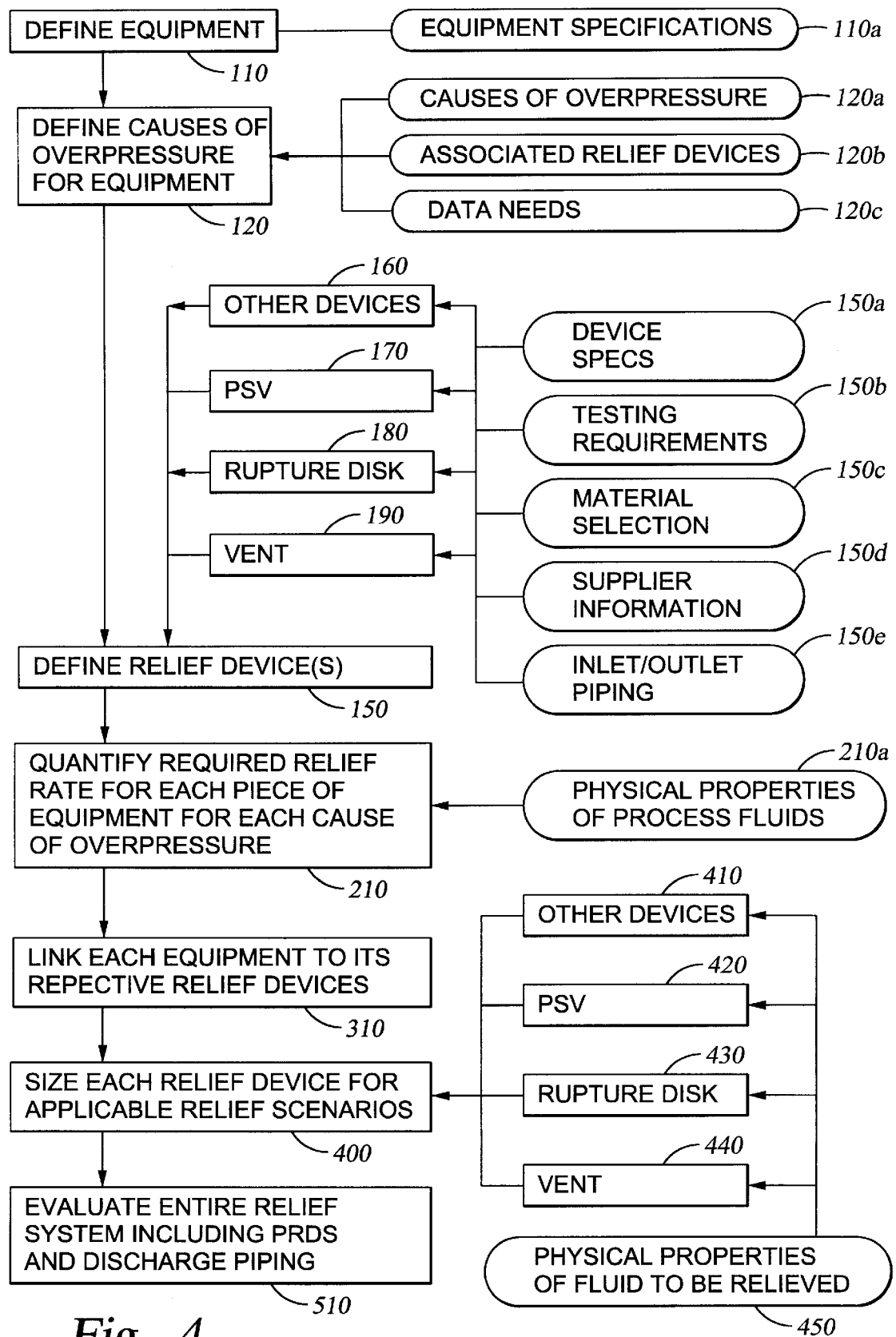
FIG. 4 is a flow diagram depicting in greater detail the method used to capture the relationships between the pieces of equipment, the potential causes of overpressure associated with each piece of equipment and specific relief devices associated with one or more pieces of equipment.

In another preferred embodiment of the PPM as illustrated by FIG. 4, the equipment is defined first 110 and the equipment specifications 110a are documented. The equipment specifications 110a include its tag number, which is subsequently used as an access code to access equipment specification data. Other specification data includes equipment type, length, height, width, material composition, volume, fluid contents, and fluid volume. Also documented are pressure and temperature conditions, manufacturer, insulation and any special comments that would be informative for future decisions regarding the equipment and associated relief devices. Although much of the data entered is for informational purposes, certain data will be utilized by the processing device of the PPM to quantify the required relief rates. For example, in quantifying the relief requirement for an external fire scenario, vessel dimensions are used to calculate the wetted-area exposed to the flames.

The causes of overpressure for that piece of equipment are then defined 120 and entered into the equipment record created during the previous step and copied into cause database that is located in the memory device of the PPM. While defining the causes of overpressure 120, the causes of overpressure are first identified 120a for that piece of equipment, the associated relief devices are identified 120b, and then the data needs necessary to determine the required relief rates are identified 120c.

In this embodiment FIG. 4, the user then defines the relief device or devices 150 associated with the equipment. Pressure safety valves (PSV) 170 are the most common relief device; the PPM also has device data for rupture disks 180, vents 190, and other devices 160. The data entered (or accessed from PPM databases stored in the memory device) for each type of pressure relief device 160, 170, 180, 190 are device specifications 150a including reference and tag numbers, used as data code for subsequent access to data. Other data specifications include pressures such as operating, set, constant, and built up pressures.

Additional data entered includes supplier information 150d such as manufacturer and model numbers, material selection 150c, testing requirements 150b, and inlet/outlet connections and piping data 150e. Outlet piping is also referred to as discharge piping FIG. 1a, 15b. The database structure of the PPM contains standard inlet and outlet sizes and their corresponding orifice areas. Other fields of data related to relief devices and familiar to one versed in the art may also be included to complete the record for the relief device. The data captured during this step 150 will be accessed later so that the PPM is able to calculate the actual relief rate and actual device size provided by the relief device.

In this embodiment, the user now quantifies the required relief rate for each cause of overpressure associated with each piece of equipment 210. The user, in other embodiments of this invention may quantify the required relief rate before defining the relief device since required relief rates are associated with causes of overpressure in the equipment not the relief device.

The user then prompts the processing device to quantify the rates 210 by accessing the PPM's overpressure cause database. The Computers processing device captures the data stored in the PPM's databases to linker databases thereby creating a relational database structure. In this way, the PPM provides access to data for rate quantifications and calculations performed by the processing device. In other embodiments, the required relief rates maybe independently calculated by the user. The user is first prompted by the PPM to enter data required for processor device of the PPM to perform the necessary calculations to quantify the required relief rate. For example, for the cause of overpressure of an external fire on a vertical vessel, some of the required data include environmental factors such as insulation, adequate drainage, and vessel elevation above ground level which are necessary because they can have a significant effect on the required relief rate. Another required field of data is the physical properties of the process fluids 210*a* contained in the equipment including fluid type, properties at relief pressure, heat of vaporization, vapor molecular weight, vapor density and liquid density (required only when vessel is 100% full of liquid which consequently results in two-phase flow during relieving conditions). The processing device of the PPM calculates the relief pressure based on the equipment's maximum allowable working pressure (MAWP) previously input in the equipment record. The relief pressure may also be calculated independently if the data is not stored in the PPM database. Additional data fields known to one skilled in the art will also be entered at this time. When all required data is entered, the user selects a rate unit and then prompts the computer processor causing the PPM to quantify the required relief rate for the cause of overpressure.

Repeating this process for each cause of overpressure associated with each piece of equipment identified by the systems expert allows the user to determine all required relief rates for all causes of overpressure scenarios. A Select Max Cause feature in the PPM allows the user to select the dominant cause of overpressure (worst case used to size the relief device) and the associated required relief rate. In most cases, the dominant causes of overpressure is apparent upon inspection. However, it should be noted that the magnitude of the required relief rate can not always be relied upon to determine the dominant cause of overpressure as different causes may require relief of different fluids at different pressures.

The user then prompts the computer processor device causing the linker database 60 to link each piece of equipment to its respective relief devices 310 by accessing data in the pressure relief device database 50 and the equipment database 70. In this way the computer links equipment to its associated relief device so that the processor quantifies the required rate and size of the relief device even in scenarios comprising more than one piece of equipment associated with one relief device FIG. 1*a* or vice versa, more than one relief device associated with one piece of equipment FIG. 1*b*. The relational database structure allows the user to systematically track each piece of equipment with its associated relief device (s) thereby determining that the plant equipment is adequately protected by its relief system. Since the required relief rate for overpressure causes has already been entered into PPM's memory device and the relief devices are linked to its associated equipment, the PPM is now ready to guide the user to size each relief device for the applicable relief scenarios 400.

In the embodiment of this invention illustrated in FIG. 4, the relief devices have already been defined and necessary data input by the user as described above. The next step is to define physical properties of the fluid to be relieved 450 for each relief device to be sized including pressure safety valves, 420, rupture disks 430, vents 440 and other devices 410. The PPM now has all the data necessary to size each relief device by quantifying its actual capacity and size. The PPM then calculates the actual relief rate for each relief device so that the user can compare the actual relief rate with the previously determined required relief rate and evaluate the adequacy of the relief devices for applicable relief scenarios 400. Finally the user evaluates the entire relief system including all pressure relief devices FIG. 1*a* 16, FIG. 1*b* 20, 22, the piping network, 13 relief headers, flare outlets etc. and discharge piping 15 to determine the adequacy of the relief system for the existing equipment 510.

Figure 5:
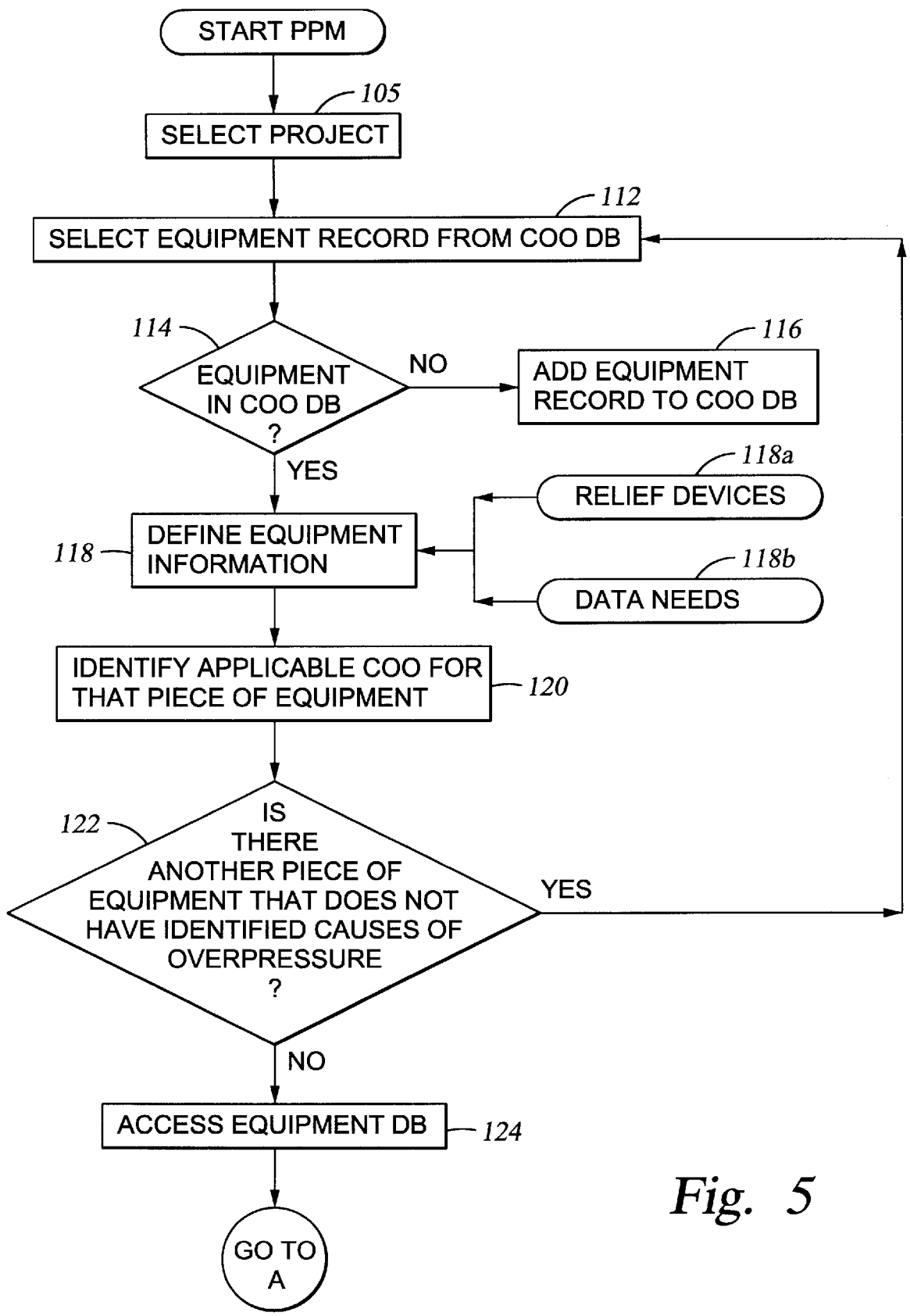
FIG. 5 is a flow diagram illustrating the identification of the potential causes of overpressure for each piece of equipment.

In another embodiment of this invention as illustrated in FIGS. 5 to 8, the methodology of this invention, the user documents all causes of overpressure for all the equipment within the plant system. FIG. 5 illustrates the identification of the potential causes of overpressure for each piece of equipment. A systems expert starts the PPM and selects the project 105 by identifying all a causes of overpressure for each piece of equipment. The systems expert may do this on the computer device 26 of this invention or may fill out the required data on paper forms so that a less experienced user actually enters the data into the causes of overpressure database located in the memory device of the PPM. The user selects the equipment record from the causes of overpressure ("COO") database 112. If the piece of equipment is not in the COO database 114, the user adds the equipment record to it 116. When the equipment record is in the COO database, the user then defines the equipment information 118 by defining the relief devices 118*a* associated with the equipment and the data needs 118*b* of the equipment. In a preferred embodiment of this invention, when a process plant has large numbers of equipment and relief devices, the user or systems expert may enter the required data for the PPM's database structure by downloading electronically via "intelligent" process and instruction diagram identification numbers, so that the systems expert simply checks for the applicable COO before moving on to the next record. The memory device of the PPM comprises much of the required data so that the user is prompted to select the appropriate data from the particular data field accessed by using tag or other identification numbers.

Continuing with the method of this invention, after defining the equipment information 118, the user identifies the applicable COO for that piece of equipment 120. If there is another piece of equipment that does not have identified causes of overpressure 122, the user selects that equipment record from the COO database 112 and completes steps decribed in 112 to 122 of the flowchart. The user repeats these steps until all pieces of equipment have had the associated causes of overpressure identified. When this is completed, the user accesses the equipment database and quantifies the required relief rate for the causes of overpressure.

Figure 6:
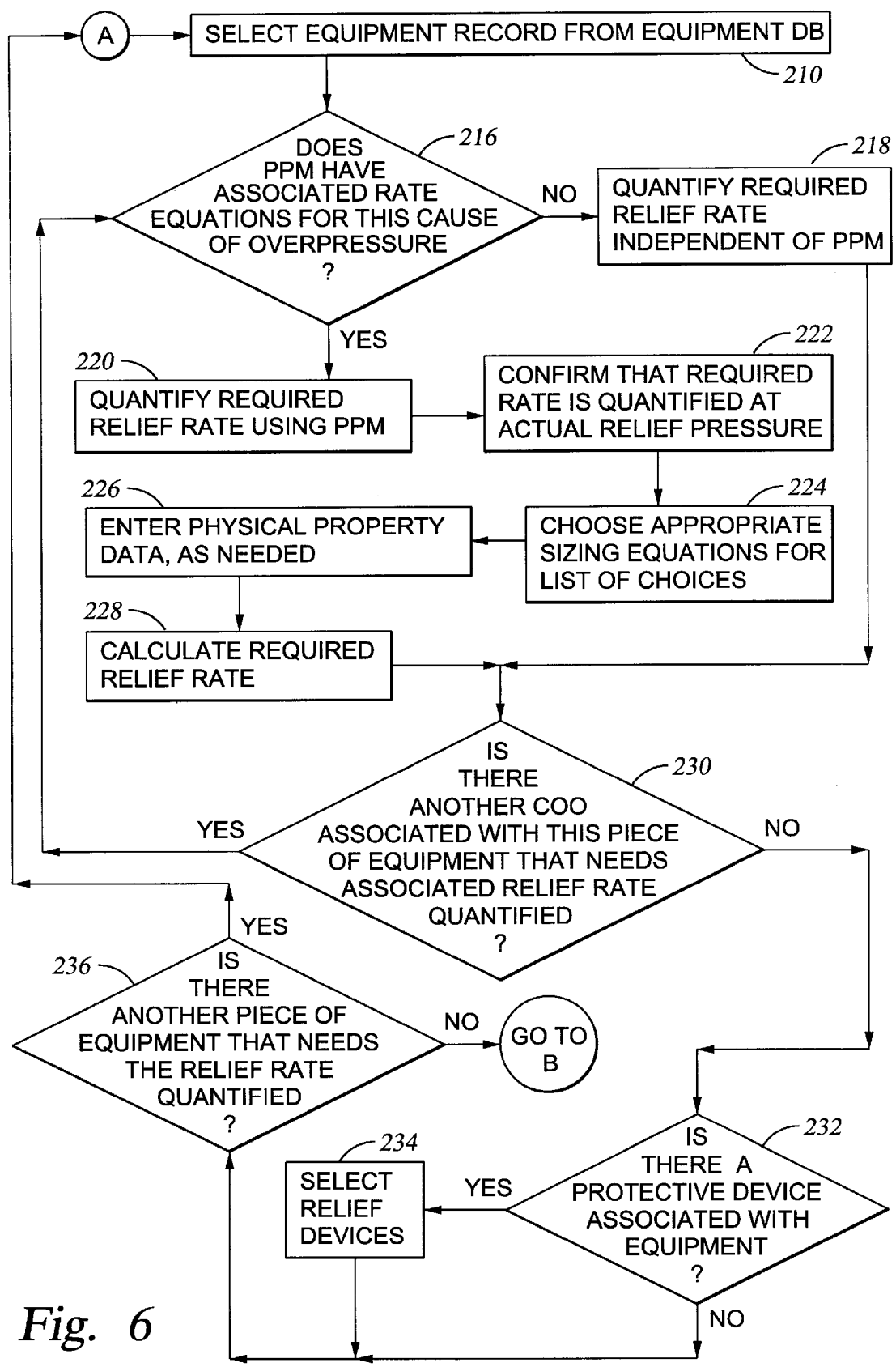
FIG. 6 is a flow diagram illustrating how required relief rates are quantified and calculated in accordance with this invention.

FIG. 6 illustrates how required relief rates are quantified and calculated in accordance with this invention. The user selects the equipment record from the equipment database 210. The equipment record is almost always in the equipment database 210 having been previously created by the user. If the record is not there 212, the user adds the equipment record to the database 214. The computer then prompts the user to quantify the required relief rates using the PPM software program 220. The PPM has the required equations stored within its memory device, and the processor device is then accessed so that the proper background calculations are performed by the PPM based on the user input which quantifies the required rates. If the PPM does not have the associated rate equations for a particular cause of overpressure, the user is prompted to quantify the required relief rate independent of the PPM 218. The user then confirms that the required relief rate is quantified at the actual relief pressure 222 within the piece of equipment. The user chooses the appropriate sizing equations for the list of choices 224 and enters physical property data as needed 226. The PPM's memory device and processor device then calculate the required relief rate 228 after the user selects the desired rate unit. If there is another COO associated with this piece of equipment that needs an associated relief rate quantified 230 the user repeats steps 216 to 230 until required relief rates for all COO are calculated. The user then determines the protective relief devices associated with each piece of equipment 232. The user selects the relief devices 234 and then repeats steps 210 to 236 until all equipment has had its relief rates quantified 236.

Figure 7A:
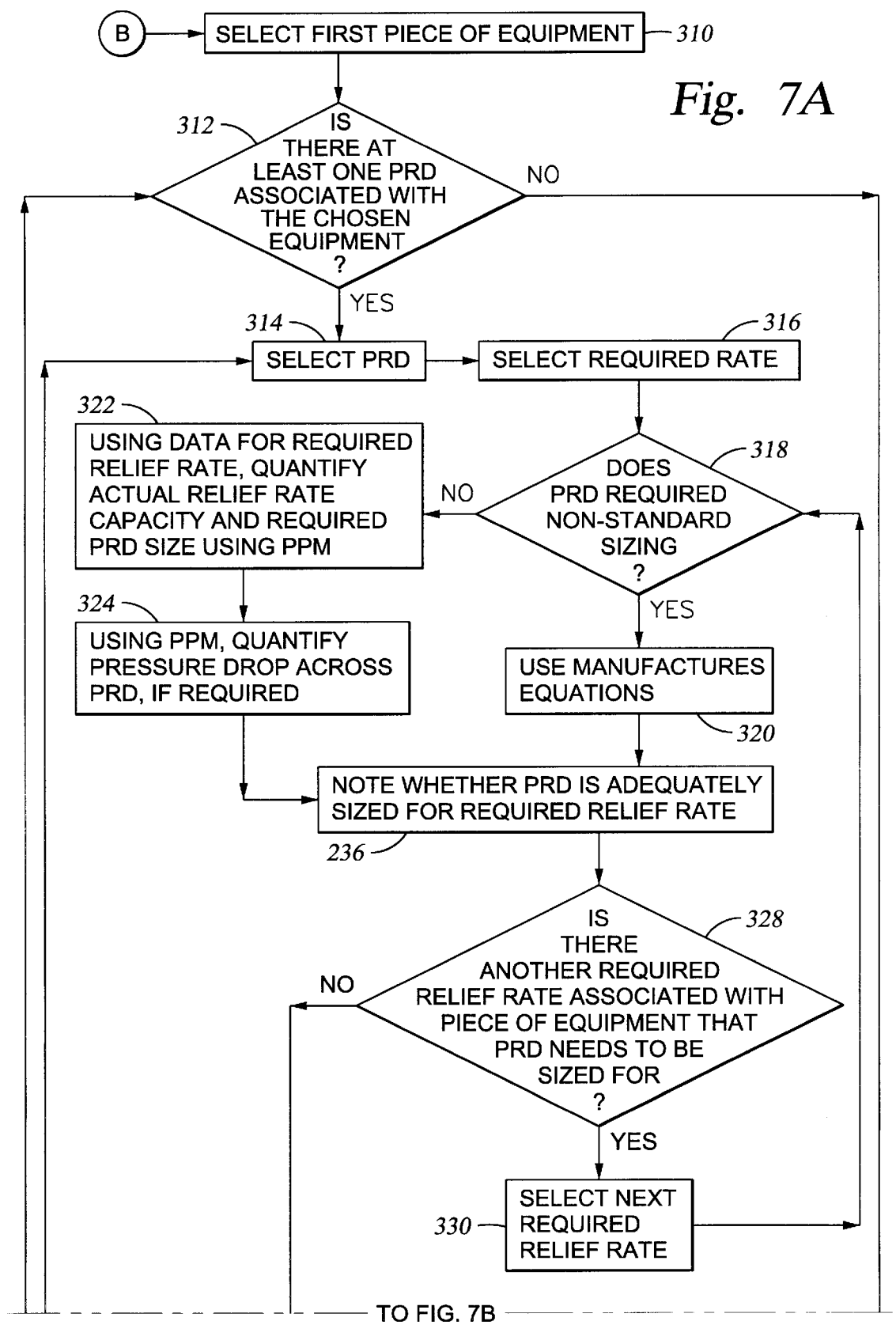
FIG. 7 is a flow diagram illustrating the linking of pressure relief devices to a protected piece of equipment and the sizing of the associated pressure relief devices in accordance with this invention.
Figure 7B:
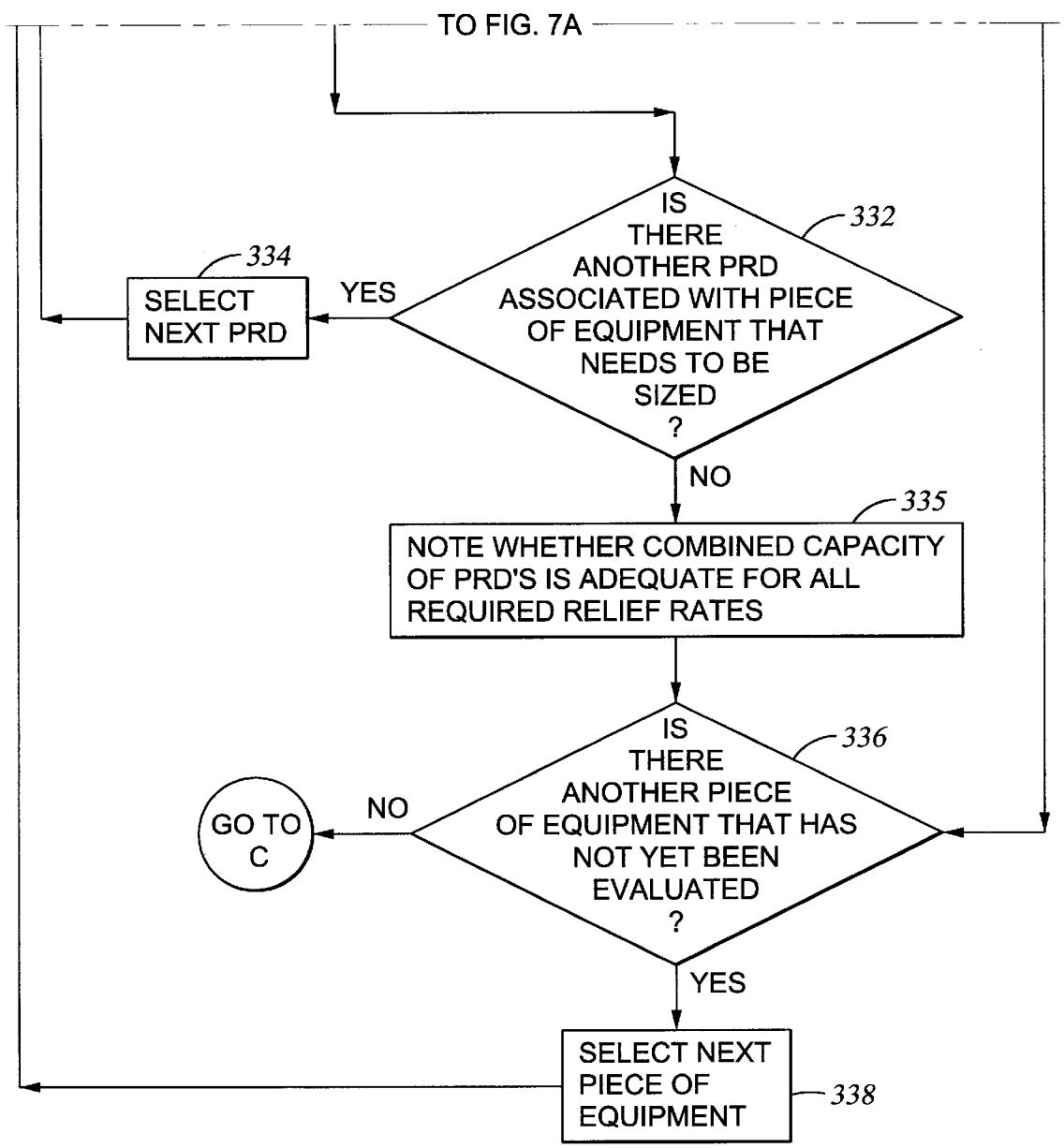

FIG. 7 illustrates the linking of pressure relief devices to a protected piece of equipment and the sizing of the associated pressure relief devices in accordance with this invention. The user selects the first piece of equipment 310 and determines if there is at least one pressure relief device ("PRD") associated with the chosen piece of equipment 312. If there is an associated PRD, the user selects that PRD 314 and then selects the previously calculated required relief rate 316. If the PRD requires non-standard sizing not found in the PPM's memory device, the user uses manufacturers equations 320 to size the PRD. If the PRD is standard, the user, using the previously determined data for required relief rate, prompts the PPM processing device to quantify actual relief rate capacity of the PRD as well as the required PRD size 322. The user then prompts the PPM to quantify the pressure drop across the PRD, if required 324. At this point the user can note whether that specific PRD is adequately sized for the required relief rate 326 by comparing the required relief rate and size with the PRD's actual relief rate and size. The user then goes on to determine if other required relief rates for a cause of overpressure are associated with that specific piece of equipment that the PRD needs to be sized for 328. If the PRD does need additional sizing, the user selects the next required relief rate 330 and repeats steps 314 to 330. If that specific PRD is appropriately sized, the user then determines if another PRD associated with that piece of equipment needs to be sized 332. If yes, the user selects the next PRD and repeats steps 314 to 332. If no, the user then notes whether the combined capacity of all PRDs is adequate for all the required relief rates for that piece of equipment 335. The user repeats this process 338, until all pieces of equipment have been evaluated 336. At that point the user is ready to evaluate the global scenarios FIG. 8.

Figure 8:
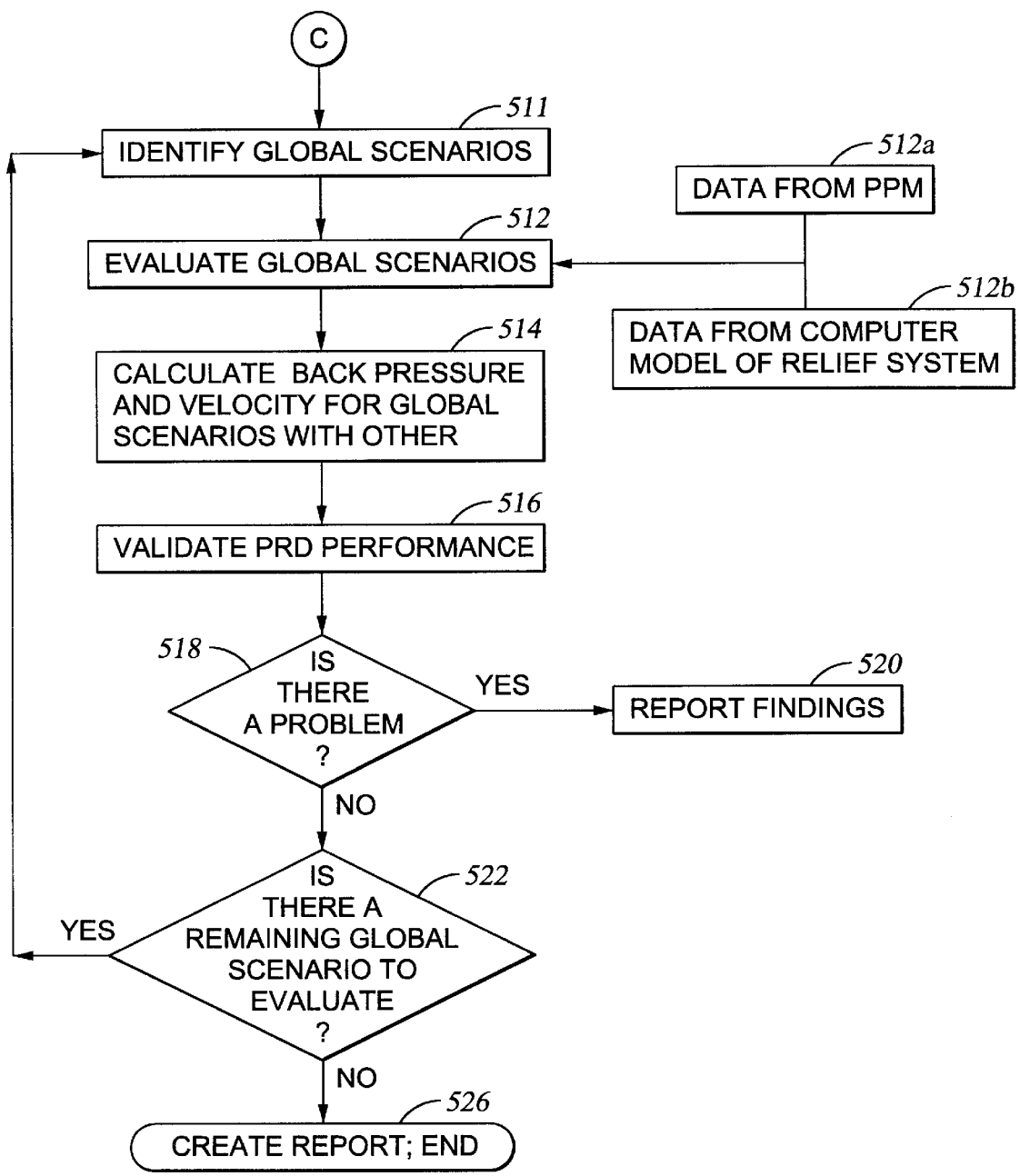
FIG. 8 is a flow diagram illustrating the evaluation of the global relief system scenarios.

FIG. 8 illustrates the evaluation of the global relief system scenarios. Global scenarios refer to events that occur in a process plant which involve multiple releases of fluids from multiple sources. The user first identifies the global scenarios 511 prompted by the user, the PPM evaluates the global scenarios 512 using required rate data previously stored in the PPM's memory device 512a and data from a computer model of the entire relief system 521b including all pressure relief devices and discharge piping. The user independently then calculates back pressure and velocity for the global scenarios 514 so that the user may then validate all the pressure relief device's performance 516. If the user determines that there is a problem 518, the user reports the problem to the appropriate experts for correction. 520. If no problem exists, the user evaluates any remaining scenarios 522 using steps 510 to 522. When the user completes the evaluation, the user creates a report for the appropriate process plant experts to review 526.

FIGS. 9 to 15 illustrate in detail a preferred embodiment of method of sizing pressure relief devices. In this preferred embodiment, all pressure relief devices are sized to gather subsequent to calculation of required rates. The user first proceeds with steps required for identifying all potential causes of overpressure FIG. 3, 100 and quantifying the required relief rate for each identified cause of overpressure 200. The user then sizes each pressure relief device for all relief scenarios that apply to it and notes which scenarios that the pressure relief device may not be adequately sized. FIG. 9 to 12 illustrate the actual sizing of a pressure relief devices for applicable relief scenarios by accessing the linker database of the PPM. After the pressure relief devices are sized, the user containing with the remaining steps of determing the adequacy of the relief system FIG. 4, 400.

Figure 9:
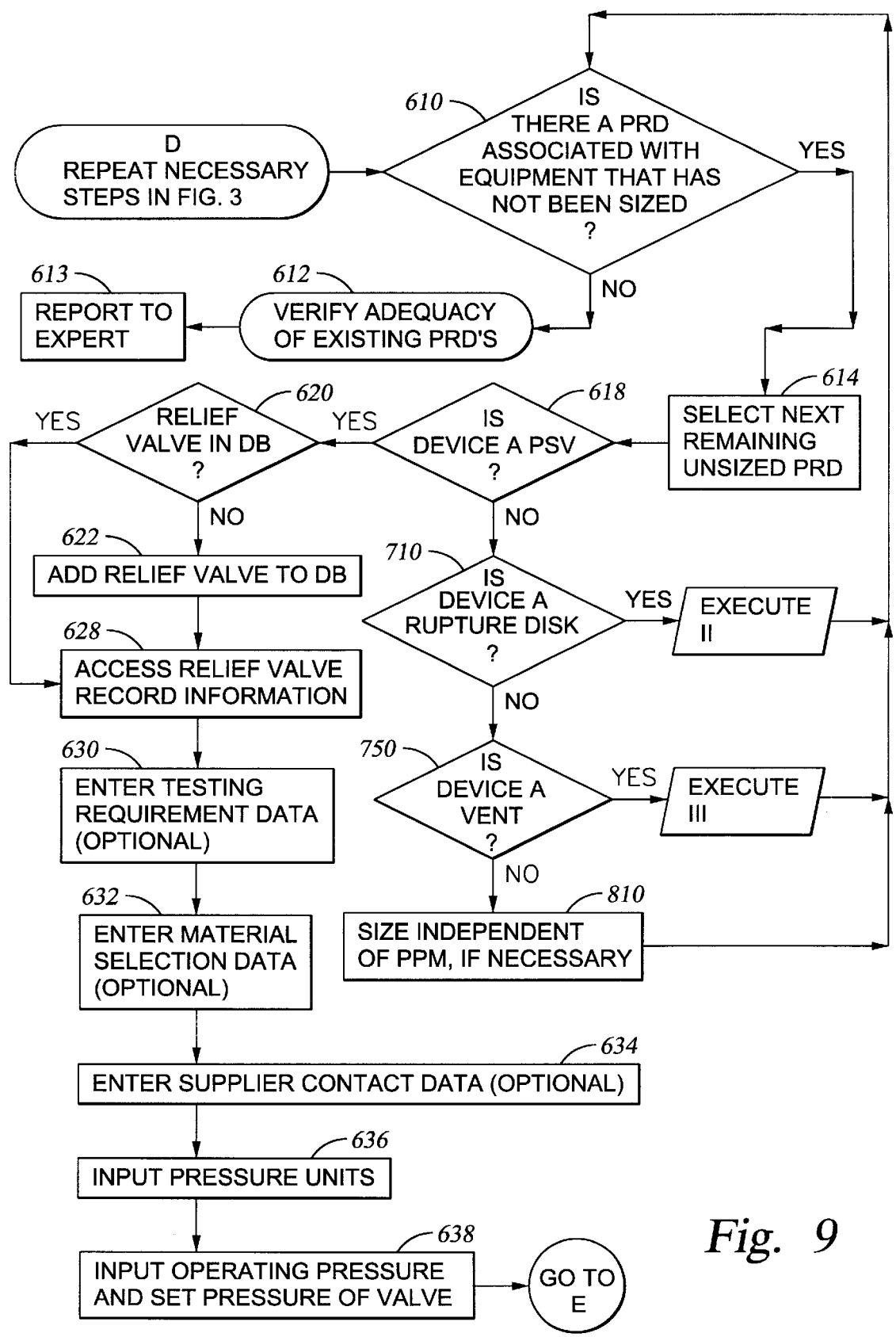
FIGS. 9–12 illustrate in detail a preferred embodiment of method of evaluating the adequacy of pressure relief devices.
Figure 10:
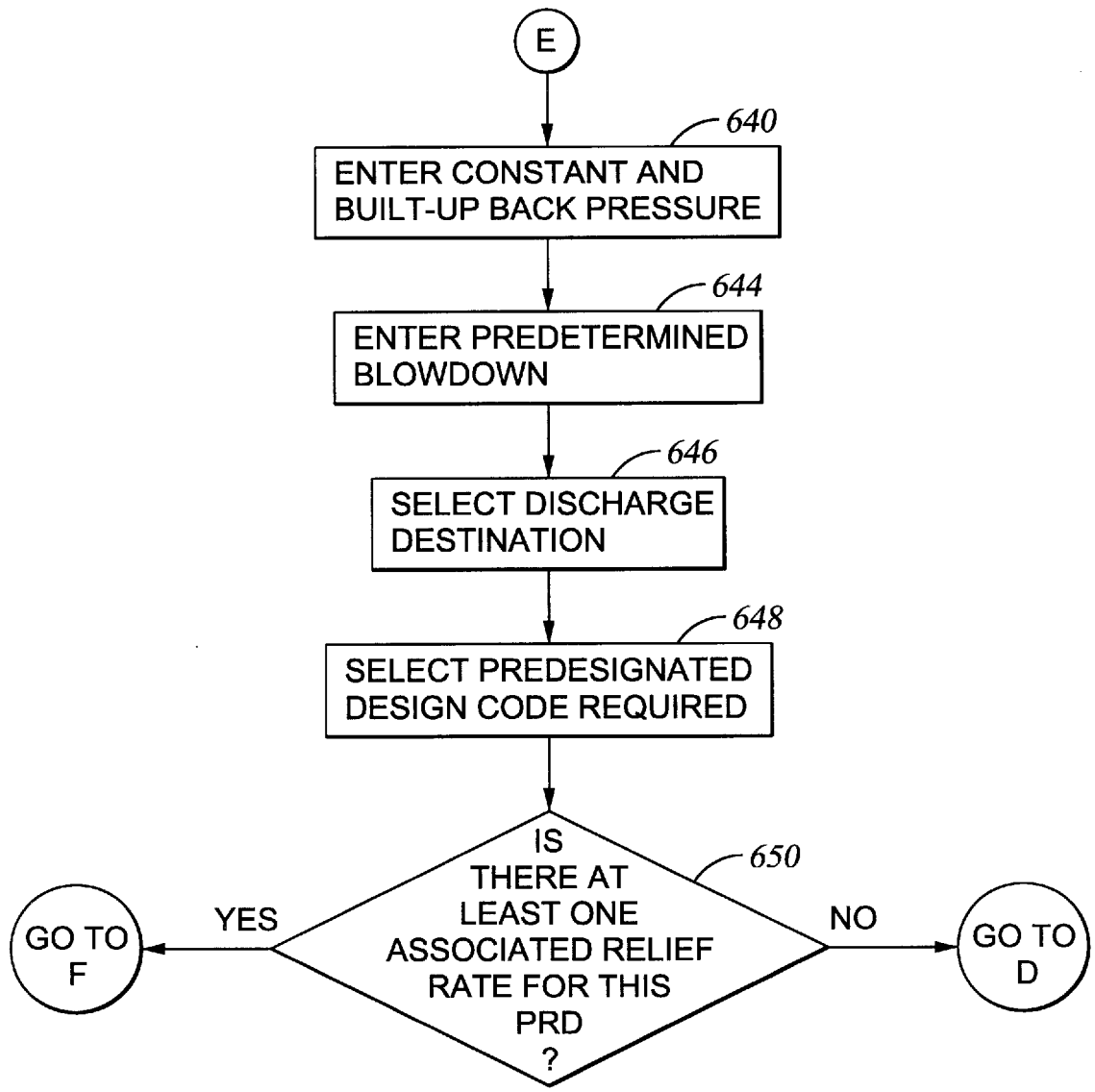

Referring to FIGS. 9 and 10, after doing the necessary preliminary steps, the user identifies a pressure relief device that has previously been linked to one or more pieces of equipment and that has not yet been sized 610. If all pressure relief devices have been sized, the user then verifies whether or not the pressure relief devices are adequate for the relief system 612. If the device is not adequate, the user reports this information to the system expert. If unsized pressure relief devices remain, the user selects the remaining unsized pressure relief device 614, and determines if the pressure relief device is a pressure safety valve 618, a rupture disk 710, a vent 750 or if it is a pressure relief device that must be sized independent of the PPM software program 810. If the device is a pressure safety valve ("PSV") 618, the user accesses the relief valve record information 628 if the relief valve is in the pressure relief device database 620 or adds the information to create a new record in the database 622. The user then enters optional data for documentation, testing requirements 630, material selection 632, supplier contact data 634. Input pressure units 636 are entered and then operating and set pressures of the valve are input 638. The constant and built-up back pressures are entered 640 as well as the predetermined blowdown 644. The user selects the discharge destination 646 and predesignated design code required 648. The user then determines if there is at least one associated relief rate for this pressure relief device 650. If not, the user repeats the necessary steps for the next pressure relief device to be sized. If there is an associated relief rate for the pressure relief device, the user begins to size the pressure relief device, FIGS. 11 and 12 using the data generated by the relational database structure of the PPM. The linker database FIG. 2, 60 links the data and calculations from the equipment database 70 to the pressure relief device database 50 so that the pressure relief devices may be sized for the associated relief rates required for the various causes of overpressure for each piece of equipment FIGS. 11 and 12, 652 to 698.

Figure 11:
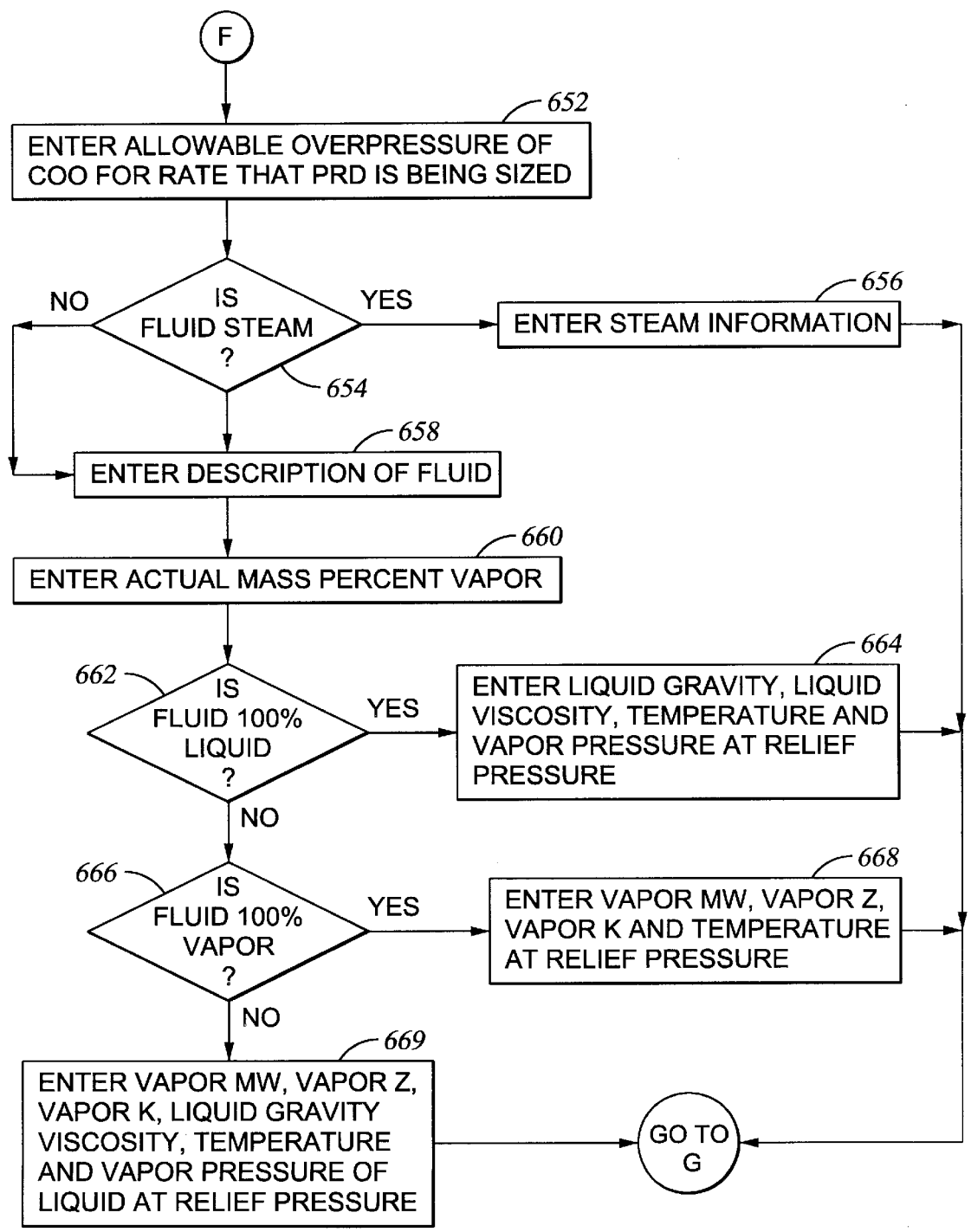

The user first enters the allowable overpressure of the cause of overpressure for rate that the pressure relief device is being sized FIG. 11, 652. If the fluid is steam 654, the user enters the steam information 656. If the fluid is not steam 654, the user enters a description of the fluid 658 and the actual mass percent vapor 660. If the fluid is 100% liquid 662, the user enters the following data: liquid gravity, liquid viscosity, temperature and vapor pressure at relief pressure 664. If the fluid is 100% vapor 666, the user enters vapor molecular weight, vapor z, vapor k and temperature at relief pressure 668. If the fluid is a mixture of liquid and vapor, the user enters vapor molecular weight, vapor z, vapor k, liquid gravity, liquid viscosity, temperature and vapor pressure at relief pressure 669.

Figure 12:
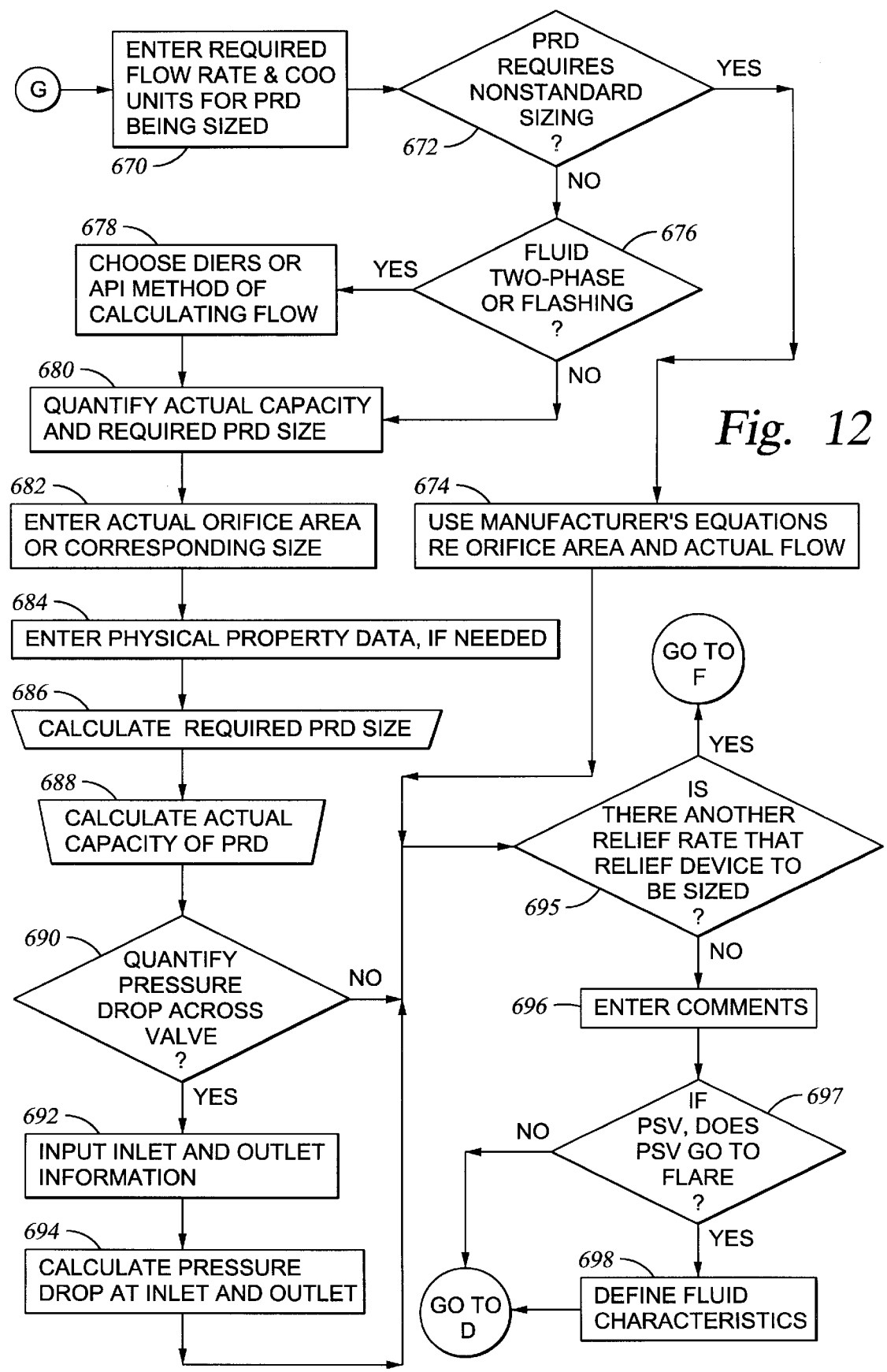

Referring to FIG. 12, the user then enters the required flow rate and cause of overpressure units for the pressure relief device being sized 670. If the pressure relief device requires nonstandard sizing 672, the user uses manufacture's equations regarding orifice area and the actual flow through the device 674. If the pressure relief device requires standard sizing 672, the user determines if the fluid is two-phase or flashing 676. If yes, the PPM prompts user to choose either the Design Institute for Emergency Relief Systems (DIERS) or the American Patroleum Institute (API) method of calculating flow from the PPM databases 678. The user then quantifies the actual capacity and required pressure relief device size 680. The user enters the actual orifice area or corresponding size 682, physical property data if needed 684 and prompts the PPM's processing device to calculate the required pressure relief device size 686 and the actual capacity of the pressure relief device 688. If a pressure drop across the device must be quantified 690, the user defines inlet and outlet information 692 and prompts the processor device to calculate the pressure drop at the inlet and outlet 694. The user then determines if there is another associated relief rate for which the relief device must be sized 695. If no, the user enters relevant comments. If the device is a pressure safety valve, the user determines if it goes to flare 697, if yes the user defines the fluid characteristics 698; if no, the user continues to size the remaining pressure relief devices. If more relief rates exist on the previously sized relief device 695, the user repeats steps 652 to 695 in FIGS. 11 and 12 until all relief rates are used for sizing that particular relief device.

Figure 13:
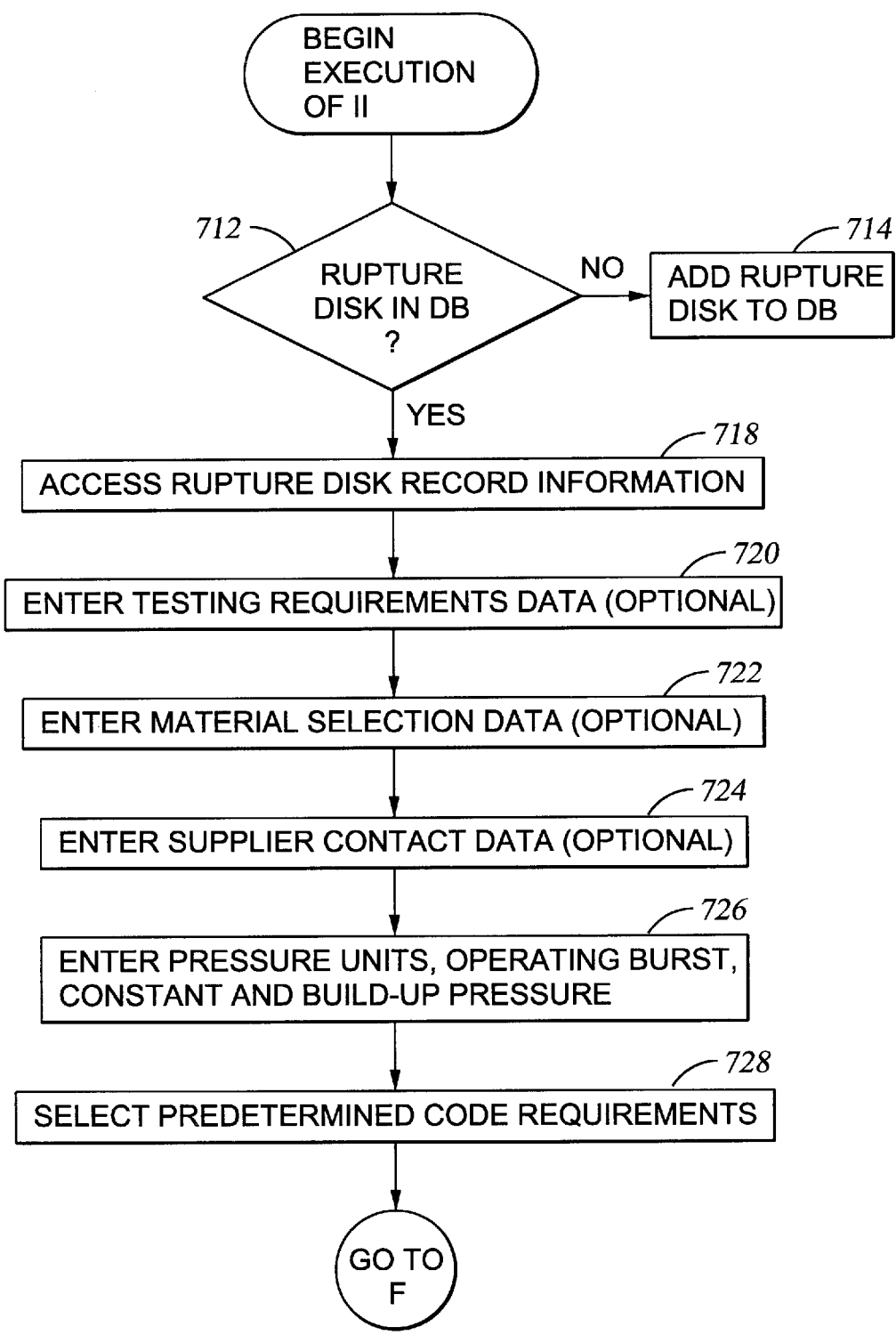
FIG. 13 is a flow diagram illustrating the defining of a pressure relief rupture disk that has been previously linked to the protected piece of equipment.

FIG. 13 illustrates the defining of a pressure relief rupture disk that has previously been linked to the protected piece of equipment. If the rupture disk is not in the PPM's database 712, the user adds it to the database 714. The user then accesses the rupture disk record information from the PPM memory device 718 and enters optional information for documentation: testing requirements data 720, material selection data 722 and supplier contact data 724. The user then enters pressure units and operating, burst, constant and build-up pressures 726. The predetermined code requirement is selected 728 and then the user repeats steps 652 to 696 in FIGS. 11 and 12.

Figure 14:
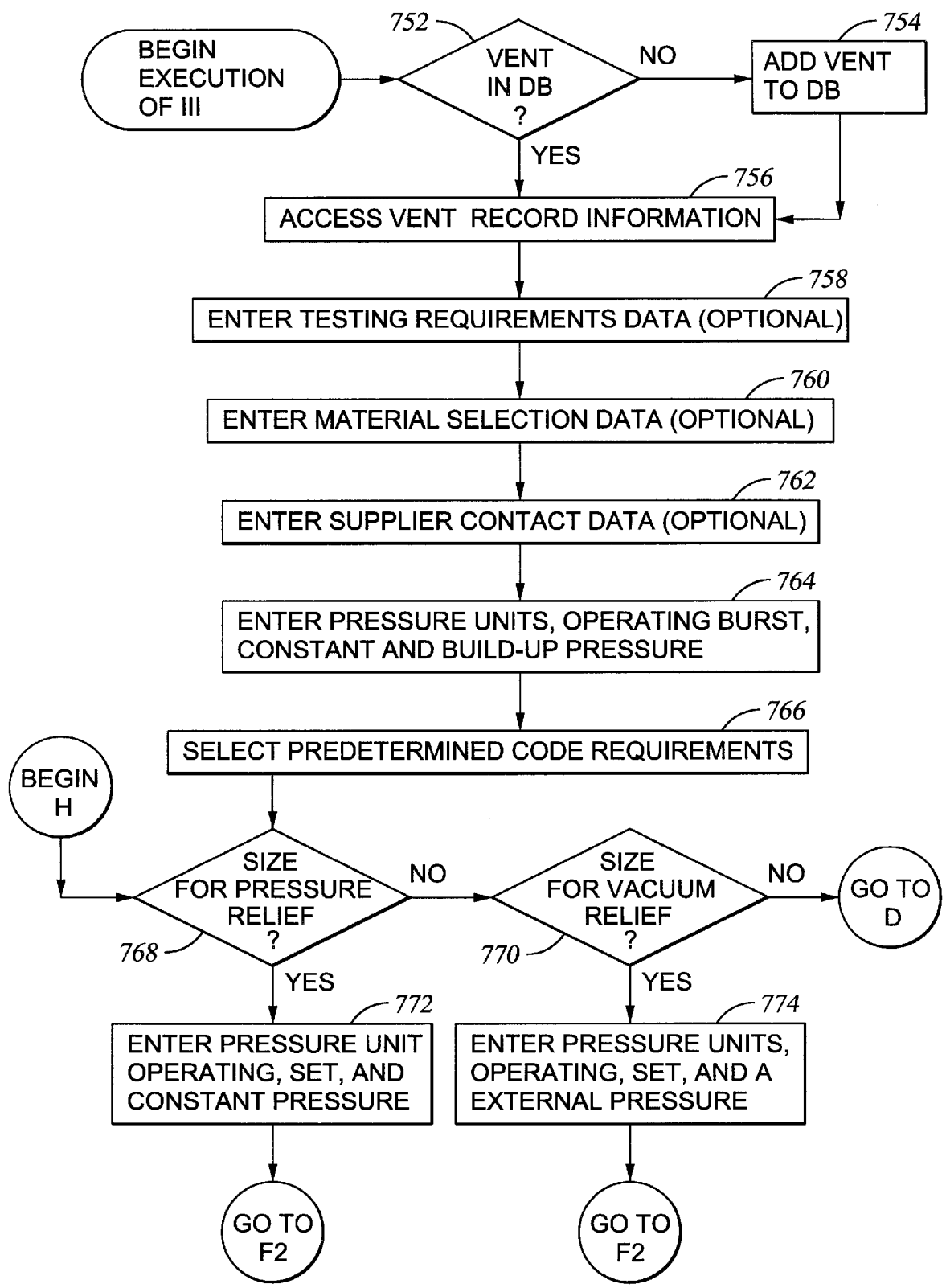
FIGS. 14 and 15 are flow diagrams illustrating the linking and sizing of a pressure relief vent to the protected piece of equipment
Figure 15:
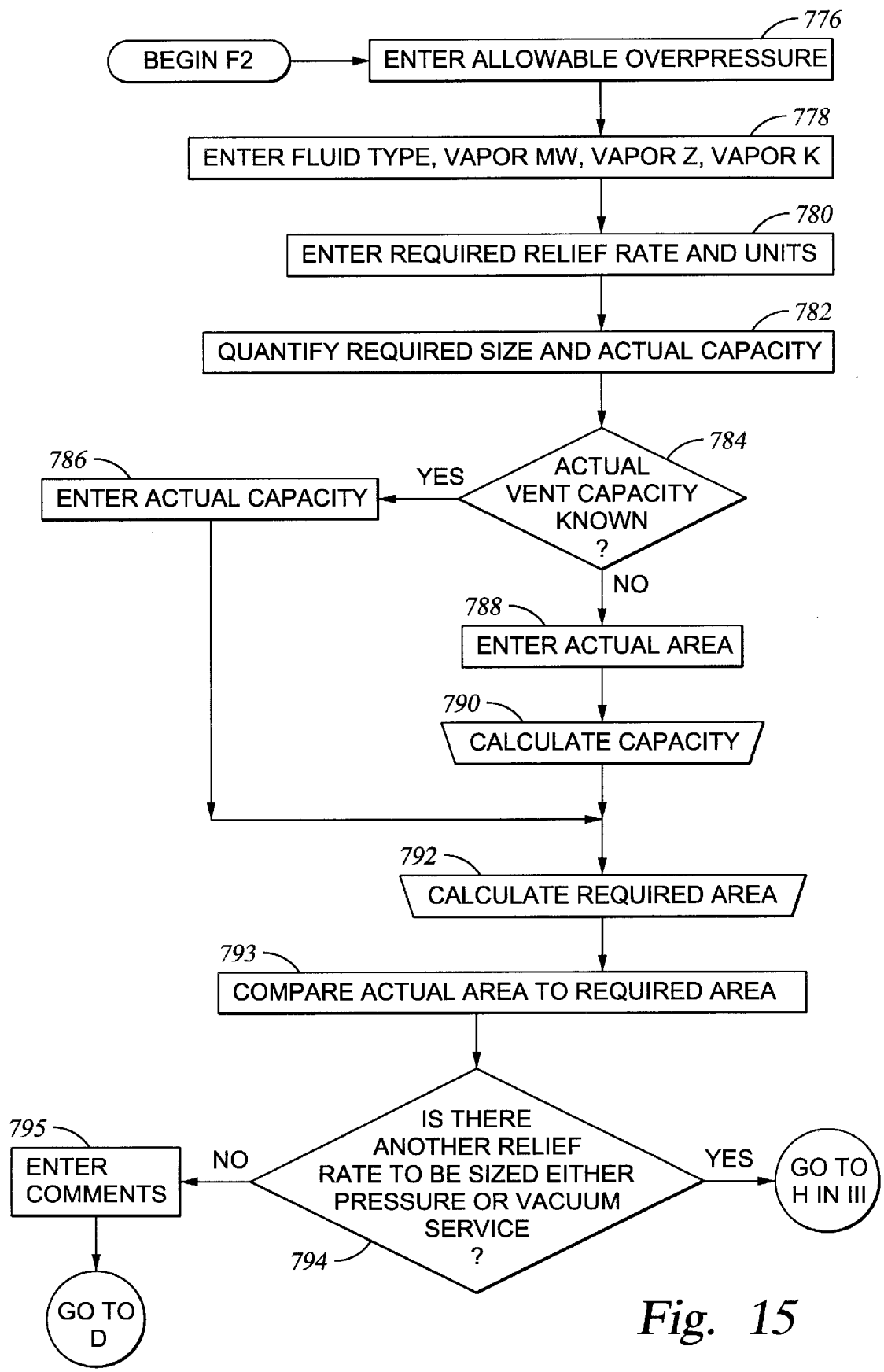

FIGS. 14 defines a vent that has been linked to one or more of equipment. FIG. 15 illustrates the sizing of a pressure relief vent to a protected piece of equipment. The user first determines if the vent is not in the PPM's database 752, and if not, the user adds it to the database 754. The user then accesses the vent record information from the PPM memory device 756 and enters optional information for documentation: testing requirements data 758, material selection data 760 and supplier contact data 762. The user then enters pressure units and operating, burst, constant and build-up pressures 764. The predetermined code requirement is selected 766. The user then determines whether to size the vent for pressure relief 768 or vacuum relief 770. If no sizing is required, the user determines if any other pressure relief device's need to be sized with the PPM using the previously described steps in FIGS. 9 and 10. If the user is sizing for pressure relief 768, the user enters the pressure unit and operating, set and constant pressures 772. If the vent is being sized for vacuum relief 770, the user enters pressure units and operating, set and external pressure 774.

Referring to FIG. 15, the user now begins to size the vent. The user enters the allowable overpressure 776, the fluid type, vapor molecular weight, vapor z and vapor k 778, and the required relief rate (previously quantified) and relief rate units 780. The user then prompts the PPM to quantify the required relief size and actual capacity of the vent 782. If the actual capacity is known, the user enters it in 786. If the actual capacity is not known 784, the user enters the actual area of the vent and then prompts the PPM to calculate the actual capacity 790. The user then prompts the PPM to calculate the required area of the device 792 and compares the actual area to the required area 793. The user then determines if there is another relief rate that requires sizing for either pressure or vacuum relief and repeats steps 768 to 794 in FIG. 14 and 15. The user enters comments 795. If there are no further relief rates to be sized for pressure or vacuum relief 794, the user repeats the procedure until all relief devices are sized.

Common Terms Used in Sizing Pressure Relief Devices

Pressure Relief Devices

PRESSURE RELIEF DEVICE—a device actuated by inlet static pressure and designed to open during an emergency or abnormal conditions to prevent a rise of internal fluid pressure in excess of a specified value. The device also may be designed to prevent excessive internal vacuum. The device may be a pressure relief valve, a nonreclosing pressure relief device, or a vacuum relief valve.

RELIEF VALVE—a spring-loaded pressure relief valve actuated y the static pressure upstream of the valve. The valve opens ormally in proportion to the pressure increase over the opening ressure. A relief valve is used primarily with incompressible fuids.

SAFETY VALVE—a spring-loaded pressure relief valve ctuated by the static pressure upstream of the valve and haracterized by rapid opening or pop action. A safety valve is ormally used with compressible fluids.

SAFETY RELIEF VALVE—a spring-loaded pressure relief valve that may be used a either a safety valve or relief valve epending on the application.

CONVENTIONAL PRESSURE RELIEF VALVE—a spring-loaded pressure relief valve that incorporates a means for minimizing the effect of back pressure on the performance characteristics.

PILOT-OPERATED PRESSURE RELIEF VALVE—a pressure relief valve in which the main valve is combined with and controlled by an auxiliary pressure relief valve.

RUPTURE DISK DEVICE—a nonreclosing differential pressure relief device actuated by inlet static pressure and designed to unction by bursting the pressure-containing rupture disk. A upture disk device includes a rupture disk device includes a upture disk and a rupture disk holder.

Dimensional Characteristics of Pressure Relief Devices

INLET SIZE—the nominal pipe size (NPS) of the valve at the inlet conditions, unless otherwise designated.

OUTLET SIZE—the nominal pipe size (NPS) of the valve at the discharge connection, unless otherwise designated.

LIFT—the actual travel of the disk away from the closed position when a valve is relieving.

Operational Characteristics

MAXIMUM OPERATING PRESSURE—the maximum expected during system operation.

MAXIMUM ALLOWABLE WORKING PRESSURE (MAWP)—the maximum gauge pressure permissible at the top of a completed vessel in it's operating position for a designated temperature. The pressure is based on calculations for each element in a vessel using nominal thickness, exclusive of additional metal thickness allowed for corrosion and loadings other than pressure. The maximum allowable working pressure is the basis for the pressure setting of the pressure relief devices that protect the vessel.

DESIGN GAUGE PRESSURE—refers to at least the most severe conditions of coincident temperature and pressure expected during operation. This pressure may be used in place of the maximum allowable working pressure in all cases where the MAWP has not been established. The design pressure is equal to or less than the MAWP.

ACCUMULATION—the pressure increase over the maximum allowable working pressure of the vessel during discharge through the pressure units or as a percent maximum allowable accumulations are established by applicable codes for operating and fire contingencies.

OVERPRESSURE—the pressure increase over the set pressure of the relieving device, expressed in pressure units or as a percent. It is the same as accumulation when the relieving device is set at the maximum allowable working pressure of the vessel.

RATED RELIEVING CAPACITY—that portion of the measured relieving capacity permitted by the applicable code or regulation to be used as a basis for the application of a pressure relief device.

Device Pressures

SET PRESSURE—the inlet gauge pressure at which the pressure relief valve is set to open under service conditions.

COLD DIFFERENTIAL SET PRESSURE—the pressure at which the pressure relief valve is adjusted to open on the test stand. The cold differential test pressure includes corrections for the service conditions of back pressure or temperature or both.

BACK PRESSURE—the pressure that exists at the outlet of a pressure relief device as a result of the pressure in the discharge system. It is the sum of the superimposed and built-up back pressures.

BUILT-UP BACK PRESSURE—the increase in pressure in the discharge header that develops as a result of flow after the pressure relief device opens.

SUPERIMPOSED BACK PRESSURE—the static pressure that exists at the outlet of a pressure relief device at the time the device is required to operate. It is the result of pressure in the discharge system coming from other sources and may be constant or variable.

BLOWDOWN the difference between the set pressure and the closing pressure of a pressure relief valve. expressed as a percent of the set pressure or in pressure units.

OPENING PRESSURE—the value of increasing inlet static pressure at which there is a measurable lift of the disk or at which discharge of the fluid becomes continuous.

CLOSING PRESSURE—the value of decreasing intet static pressure at which the valve disk reestablishes contact with the seat or at which lift becomes zero.

SIMMER—the audible or visible escape of compressible flui between the seat and disk at an inlet static pressure below the set pressure and at no measurable capacity.

LEAK-TEST PRESSURE—the specified inlet static pressure at which a seat leak test is performed.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. An apparatus for determining and documenting overpressure protection due to causes of overpressure associated with equipment and pressure relief devices the apparatus comprising: a computer system comprising a memory device, a processing device, a program in communication with the processing device and memory device, the processing device performing tasks required by the program, the memory device further comprising:

a relational database structure, the relational database structure comprising:
(a) an equipment database,
(b) a pressure relief devices database,
(c) a linker database communicating with the pressure relief devices database and the equipment database, and
(d) a causes of overpressure database communicating with the equipment database.

2. The apparatus of claim 1 wherein the pressure relief devices database communicates with other database devices comprising a pressure relief valves database device, a rupture disks database device, a tank vents database device and an other devices database device.

3. The apparatus claim 1 further comprising an identification causes of overpressure database for identifying potential causes of overpressure for each piece of equipment and providing identified data for use in other database wherein the relational database structure comprises:

(a) the equipment database device linked to the causes of overpressure database device and further linked to linker database device for quantifying the required relief rate for each identified cause of overpressure
(b) the equipment database linked to the linker database, and the linker database linked to the pressure relief database for quantifying actual relief capacity for the actual relief devices,
(c) the pressure relief devices database, the pressure relief valves database, the rupture disks database, the tank vents database and the other devices database communicating for the purpose of quantifying required relief device size for the required relief rates.

4. The apparatus of claim 1 wherein the processing device further comprises means for instructing the user to evaluate and quantify the adequacy of the pressure relief device.

5. The apparatus of claim 1 wherein the processing device further comprises means for quantifying and evaluating global scenarios and release from individual pressure relief devices as associated with discharge piping and relief headers.

6. A method for determining and documenting overpressure protection due to causes of overpressure associated with equipment and pressure relief devices, the method comprising the steps of:

(1) identifying all potential causes of overpressure for each piece of equipment,
(2) quantifying the required relief rate for each identified cause of overpressure,
(3) quantifying and evaluating adequacy of pressure relief device, and
(4) identifying and evaluating global scenarios and release from individual pressure relief devices as associated with discharge piping and relief headers.

7. The method of claim 6 wherein the the step of quantifying and evaluating adequacy of pressure relief device further comprises the steps of:

(a) quantifying actual relief capacity for the actual relief devices, (b) quantifying required relief device size for the required relief rates, (c) evaluating and quantifying the adequacy of pressure relief device.

8. The method of claim 6 wherein the pressure relief device is a pressure safety valve.

9. The method of claim 6 wherein the pressure relief device is a rupture disk.

10. The method of claim 6 wherein the pressure relief device is a vent.

11. The method of claim 6 wherein the pressure relief device is any other device functioning as a pressure relief device.

12. The method of claim 6 wherein the step of identifying all potential causes of overpressure comprises the steps of:

(a) defining the causes of overpressure, (b) defining the associated relief devices, and (c) defining the relevant data needs to determine the required relief rates.

13. The method of claim 6 wherein each relief device is defined comprises the steps of:

(a) determining whether the relief device is a pressure safety valve, and if so, the pressure safety valve is defined comprising the steps of:

(1) defining the device specifications for the pressure safety valve, if any, (2) defining the testing requirements for the pressure safety valve, if any, (3) defining the material selection requirements for the pressure safety valve, if any, (4) defining supplier information for the pressure safety valve, if any, and (5) defining the inlet and outlet connections and piping data for the pressure safety valve, if any, (b) determining whether the relief device is a rupture disk, and if so, the rupture disk is defined comprising the steps of:

(1) defining the device specifications for the rupture disk, if any, (2) defining the testing requirements for the rupture disk, if any, (3) defining the material selection requirements for the rupture disk, if any, (4) defining supplier information for the rupture disk, if any, and (5) defining the inlet and outlet connections and piping data for the rupture disk, if any, (c) determining whether the relief device is a vent, and if so, the vent is defined comprising the steps of:

(1) defining the device specifications for the vent, if any, (2) defining the testing requirements for the vent, if any, (3) defining the material selection requirements for the vent, if any, (4) defining supplier information for the vent, if any, and (5) defining the inlet and outlet connections and piping data for the vent, if any, (d) determining whether the relief device is another device, and if so, the other relief device is defined comprising the steps of:

(1) defining the device specifications for the other relief device, if any, (2) defining the testing requirements for the other relief device, if any, (3) defining the material selection requirements for the other relief device, if any, (4) defining supplier information for the other relief device, if any, and (5) defining the inlet and outlet connections and piping data for the other relief device, if any.

14. The method of claim 6 wherein the step of quantifying the required relief rate for each identified cause of overpressure comprises the step of defining the physical properties of the process fluids contained in the equipment including fluid type, physical properties at relief pressure, heat of vaporization, vapor molecular weight, vapor density and liquid density.

15. A method for determining and documenting overpressure protection comprising the steps of:

(a) defining each piece of process plant equipment in an equipment record in an equipment database, (b) defining one or more causes of overpressure for each piece of equipment in a causes record in an identification of causes of overpressure database and linking the causes records to the corresponding equipment record in the equipment database, (c) defining one or more relief devices in a device record in a pressure relief devices database, (d) quantifying required relief device for each piece of equipment for each cause of overpressure in the causes of overpressure database, (e) linking each equipment record in the equipment database to its respective device records in the pressure relief devices database, (f) sizing each relief device for applicable relief scenarios, and (g) evaluating entire relief system including pressure relief devices and discharge piping.

16. A method for determining and documenting overpressure protection due to causes of overpressure associated with equipment and pressure relief devices comprising the steps of:

(a) selecting a piece of equipment associated with the causes of overpressure, (b) defining equipment information, (c) identifying applicable causes of overpressure for a particular piece of equipment, (d) quantifying a required relief rate, (e) choosing the appropriate sizing equations for particular piece of equipment, (f) entering physical property data, as needed, (g) calculating required relief rate, (h) selecting relief devices, (i) selecting a piece of equipment, (j) evaluating pressure relief device requirements, (k) identifying global scenarios, (l) quantifying global scenarios, (m) calculating back pressure and velocity for global scenarios, and (n) validating device performance.

17. The method of claim 15 wherein the step of evaluating pressure relief device requirements comprises the steps of:

(a) evaluating whether the pressure relief device requires non-standard sizing, and if so, using the manufacturer's equations, and if not, using data for required relief rate, (b) quantifying the actual relief rate capacity and the required pressure relief device size, and (c) quantifying pressure drop across pressure relief device, if required.

18. A method for determining and documenting overpressure protection due to causes of overpressure associated with equipment and pressure relief devices comprising the steps of:
   (a) identifying all potential causes of overpressure for each piece of equipment,
   (b) quantifying a required relief rate for each identified cause of overpressure,
   (c) defining operating pressure and set pressure associated with relief device,
   (d) defining constant and built-up back pressure,
   (e) defining predetermined blowdown,
   (f) selecting discharge destination and predesignated design code,
   (g) selecting allowable overpressure for rate that the relief device is being sized,
   (h) determining if the fluid is a stream,
   (i) defining required flow rate and cause of overpressure units for pressure relief device being sized,
   (j) determining nonstandard sizing requirements,
   (k) determining if pressure relief devices goes to flare, and
   (l) verifying adequacy of existing pressure relief devices.

19. The method of claim 18 wherein the step of determining nonstandard sizing requirements comprises the steps of:
   (a) evaluating that nonstandard sizing is not required, and
   (b) using manufacturer's equations concerning orifice area and actual flow.

20. The method of claim 18 wherein the step of determining nonstandard sizing requirements comprises the steps of:
   (a) evaluating that nonstandard sizing is required,
   (b) if fluid is two-phase or flashing, using Design Institute for Emergency Release Systems or American Petroleum Institute method of calculating flow, and thereafter quantifying actual capacity and required pressure relief device size,
   (c) if fluid is not two-phase or flashing, quantifying actual capacity and required prd size,
   (d) entering actual orifice area or corresponding size,
   (e) entering physical property data, if needed,
   (f) calculating required pressure relief device size,
   (g) calculating actual capacity of pressure relief device,
   (h) if a pressure drop across valve exists, implement the steps,
      (1) defining inlet and outlet information,
      (2) calculating pressure drop at inlet and outlet,
   (i) if relief valve and goes to flare, implement the step of defining the fluid characteristics, and
   (j) verifying adequacy of existing pressure relief devices.

21. The method of claim 17 wherein the step of determining if the fluid is a stream comprises the steps of:
   (a) determining that the fluid is a steam,
   (b) entering the steam information,
   (c) defining required flow rate and cause of overpressure units for pressure relief device being sized,
   (d) determining nonstandard sizing requirements,
   (e) determining if relief valve goes to flare, and
   (f) verifying adequacy of existing pressure relief devices.

22. The method of claim 18 wherein the step of determining if the fluid is steam comprises the steps of:
   (a) determining that the fluid is not steam,
   (b) entering the description of the fluid,
   (c) entering the actual mass percent vapor,
   (d) if the fluid is 100% liquid, implementing the following steps,
      (1) entering liquid gravity, liquid viscosity, temperature and vapor pressure at relief pressure,
      (2) defining required flow rate and cause of overpressure units for pressure relief device being sized,
      (3) determining nonstandard sizing requirements,
      (4) determining if relief valve goes to flare, and
      (5) verifying adequacy of existing pressure relief devices.
   (e) if the fluid is not 100% liquid, implementing the following steps,
      (1) if the fluid is not 100% vapor, implementing the following steps,
         (A) entering vapor molecular weight, vapor compressibility, vapor specific heat ration and temperature at relief pressure,
         (B) defining required flow rate and cause of overpressure units for pressure relief device being sized,
         (C) determining nonstandard sizing requirements,
         (D) determining if relief valve goes to flare, and
         (E) verifying adequacy of existing pressure relief devices.
      (2) if the fluid id 100% vapor, implementing the following steps,
         (A) entering vapor molecular weight vapor compressibility, vapor specific heat ration, liquid gravity, liquid viscosity, temperature and vapor pressure of liquid at relief pressure,
         (B) defining required flow rate and cause of overpressure units for pressure relief device being sized,
         (C) determining nonstandard sizing requirements,
         (D) determining if relief valves goes to flare, and
         (E) verifying adequacy of existing pressure relief devices.

23. An apparatus for determining and documenting overpressure protection due to causes of overpressure associated with equipment and pressure relief devices, the apparatus comprising:
   a computer system comprising a memory device, a processing device, a program in communication with the processing device and memory device, the processing device performing tasks required by the program, the memory device further comprising:
   a relational database structure, the relational database structure comprising:
      (a) one or more pressure relief devices records;
      (c) one or more causes of overpressure database records;
      (b) one or more equipment database record, wherein the equipment database record further comprises:
         (1) a link to one or more pressure relief devices records, wherein the program may access the pressure relief devices records through the equipment database record;
         (2) a link to one or more causes of overpressure records, wherein the program may access the causes of overpressure records through the equipment database record.

* * * * *

(12) EX PARTE REEXAMINATION CERTIFICATE (8473rd)

United States Patent
Berwanger

(10) Number: US 5,774,372 C1
(45) Certificate Issued: Aug. 23, 2011

(54) PRESSURE PROTECTION MANAGER SYSTEM & APPARATUS

(75) Inventor: Pat Berwanger, Houston, TX (US)

(73) Assignee: Siemens Energy, Inc., Orlando, FL (US)

Reexamination Request:
No. 90/009,528, Jul. 30, 2009

Reexamination Certificate for:
Patent No.: 5,774,372
Issued: Jun. 30, 1998
Appl. No.: 08/624,174
Filed: Mar. 29, 1996

(51) Int. Cl.
*F16K 37/00* (2006.01)

(52) U.S. Cl. .......................... 700/301; 137/12; 701/99; 702/45; 702/138

(58) Field of Classification Search .................. None
See application file for complete search history.

(56) References Cited

PUBLICATIONS

American Petroleum Institute, Sizing, Selection, and Installation of Pressure–Relieving Devices in Refineries: Part 1—Sizing and Selection. (1993). API Recommended Practice 520 (6th Ed. Washington DC), pp. 30–31.*

Kenez, J. D. Pressure Relieving System Design and Evaluation. Society of Petroleum Engineers (SPE), Inc. (Ed.), SPE Asia Pacific Oil & Gas Conference held in Melbourne, Australia Nov. 7–10, 1994 (pp. 667–679).

Getz, Ken; Litwin, Paul and Reddick, Greg (1994). Microsoft Access 2 Developer's Handbook. Chapter 2: Database Design (pp. 25–55). San Francisco, CA: Sybex, Inc.

American Petroleum Institute, Guide for Pressure–Relieving and Depressuring Systems. (1990). API Recommended Practice 521. (3rd ed., Washington, DC).

American Petroleum Institute, Sizing, Selection, and Installation of Pressure–Relieving Devices in Refineries: Part 1—Sizing and Selection. (1993). API Recommended Practice 520 (6th ed. Washington, DC).

American Petroleum Institute, Venting Atmospheric and Low–Pressure Storage Tanks: Nonrefrigerated and Refrigerated. (1992). API Standard 2000. (4th ed., Washington, DC). 29 C.F.R. § 1910. 110 (1994). pp. 356–376.

* cited by examiner

*Primary Examiner*—Zoila Cabrera

(57) ABSTRACT

The Pressure Protection Manager comprises an apparatus and method for determining and documenting overpressure protection due to causes of overpressure associated with equipment and pressure relief devices used in industries such as, for example, process plants having process fluids. The apparatus is used in association with a computer system having a memory device, a processing device, and a program in communication with the processing device and memory device program, the processing device performing tasks required by the program and the computer system further having input and output devices, the memory device comprises: a relational database structure, the relational database structure comprising an equipment database, a pressure relief devices database, a linker database communicating with the pressure relief devices database and the equipment database, and a causes of overpressure database communicating with the equipment database.

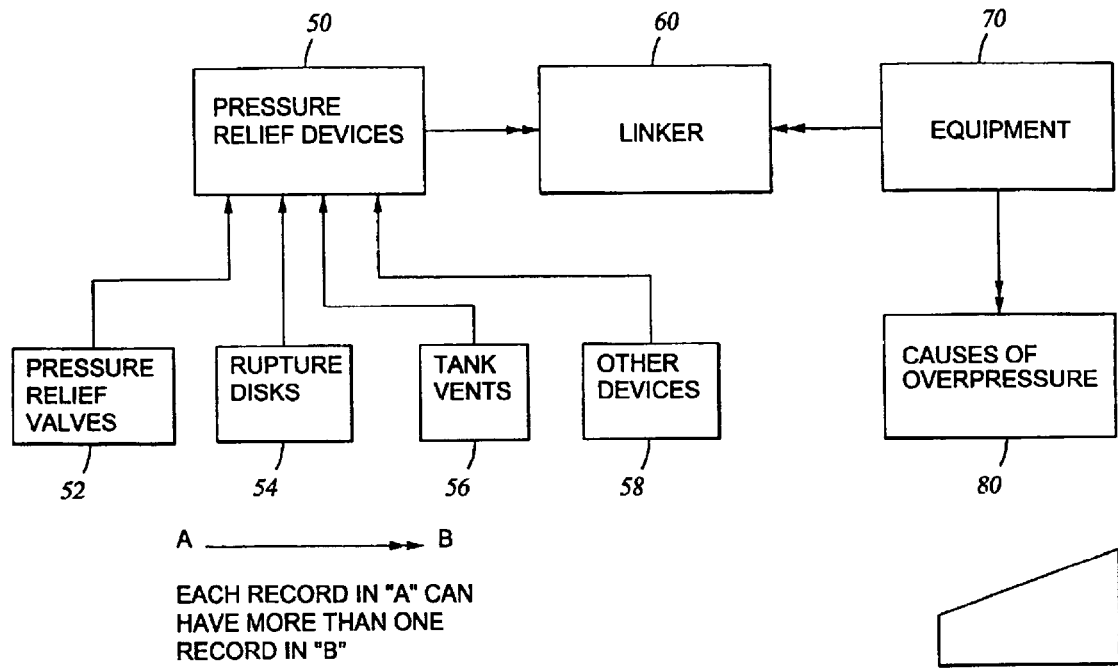

US 5,774,372 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentablility of claims 1-5, 15, 17, 21 and 23 is confirmed.

Claims 6-7 and 12-14 are cancelled.

Claims 8-11, 16 and 18 are determined to be patentable as amended.

Claims 19-20 and 22, dependent on an amended claim, are determined to be patentable.

New claims 24-31 are added and determined to be patentable.

8. The method of claim [6] *15* wherein the pressure relief device is a pressure safety valve.

9. The method of claim [6] *15* wherein the pressure relief device is a rupture disk.

10. The method of claim [6] *15* wherein the pressure relief device is a vent.

11. The method of claim [6] *15* wherein the pressure relief device is any other device functioning as a pressure relief device.

16. [A] *The* method [for determining and documenting overpressure protection due to causes of overpressure associated with equipment and pressure relief devices] *of claim 15 further* comprising the steps of:

(a) selecting a piece of equipment associated with the causes of overpressure,
(b) defining equipment information,
(c) identifying applicable causes of overpressure for a particular piece of equipment,
(d) quantifying a required relief rate,
(e) choosing the aprropriate sizing equations for particular piece of equipment,
(f) entering physical property data, as needed,
(g) calculating required relief rate,
(h) selecting relief devices,
(i) selecting a piece of equipment,
(j) evaluating pressure relief device requirements,
(k) identifying global scenarios,
(l) quantifying global scenarios,
(m) calculating back pressure and velocity for global scenarios, and
(n) validating device performance.

18. [A] *The* method [for determining and documenting overpressure protection due to causes of overpressure associated with equipment and pressure relief devices] *of claim 15 further* comprising the steps of:

(a) identifying all potential causes of overpressure for each piece of equipment,
(b) quantifying a required relief rate for each identified cause of overpressure,
(c) defining operating pressure and set pressure associated with relief device,
(d) defining constant and built-up back pressure,
(e) defining predetermined blowdown,
(f) selecting discharge destination and predesignated design code,
(g) selecting allowable overpressure for rate that the relief device is being sized,
(h) determining if the fluid is a stream,
(i) defining required flow rate and cause of overpressure units for pressure relief device being sized,
(j) determining nonstandard sizing requirements,
(k) determining if pressure relief devices goes to flare, and
(l) verifying adequacy of existing pressure relief devices.

*24. The apparatus of claim 1 wherein the equipment database device is linked to the causes of overpressure database device and structured such that each piece of equipment has associated with it one or more causes of overpressure identified for that piece of equipment.*

*25. A computer-implemented method for determining and documenting overpressure protection comprising the steps of:*

*(a) defining each piece of process plant equipment in an equipment record in an equipment database,*
*(b) defining one or more causes of overpressure for each piece of equipment in a causes record in an identification of causes of overpressure database and linking the causes records to the corresponding equipment record in the equipment database,*
*(c) defining one or more relief devices in a device record in a pressure relief devices database,*
*(d) quantifying required relief device for each piece of equipment for each cause of overpressure in the causes of overpressure database,*
*(e) linking each equipment record in the equipment database to its respective device records in the pressure relief devices database,*
*(f) sizing each relief device for applicable relief scenarios, and*
*(g) evaluating entire relief system including pressure relief devices and discharge piping.*

*26. A computer-implemented method for determining and documenting overpressure protection due to causes of overpressure associated with equipment and pressure relief devices, the method comprising the steps of:*

*(1) identifying all potential causes of overpressure for each piece of equipment and storing in an equipment record in an equipment database,*
*(2) quantifying the required relief rate for each identified cause of overpressure and storing in a causes record in an identification of causes of overpressure database and linking the causes records to the corresponding equipment record in the equipment database,*
*(3) quantifying and evaluating adequacy of pressure relief device and storing in a device record in a pressure relief devices database,*
*(4) identifying and evaluating global scenarios and release from individual pressure relief devices as associated with discharge piping and relief headers, and*

(5) linking each equipment record in the equipment database to its respective device records in the pressure relief devices database, wherein a database structure for one or more of the equipment database, the causes of overpressure database, and the pressure relief devices database comprises a flat file database.

27. The method of claim 25 further comprising a database structure for storing one or more of potential causes of overpressure database, equipment database, and pressure relief devices database.

28. The method of claim 27 wherein the database structure comprises a flat file database.

29. The method of claim 25 wherein a memory device stores thereon one or more records for potential causes of overpressure, equipment, and pressure relief devices.

30. The method of claim 29 further comprising a database structure in the memory device for storing the one or more records.

31. The method of claim 30 wherein the database structure comprises a flat file database.

* * * * *

(12) EX PARTE REEXAMINATION CERTIFICATE (9874th)

United States Patent
Berwanger

(10) Number: US 5,774,372 C2
(45) Certificate Issued: Oct. 15, 2013

(54) PRESSURE PROTECTION MANAGER SYSTEM AND APPARATUS

(75) Inventor: Pat Berwanger, Houston, TX (US)

(73) Assignee: Siemens Energy, Inc., Orlando, FL (US)

Reexamination Request:
No. 90/009,941, Aug. 1, 2011

Reexamination Certificate for:
Patent No.: 5,774,372
Issued: Jun. 30, 1998
Appl. No.: 08/624,174
Filed: Mar. 29, 1996

Reexamination Certificate C1 5,774,372 issued Aug. 23, 2011

(51) Int. Cl.
*F16K 37/00* (2006.01)

(52) U.S. Cl.
USPC .............. 700/301; 137/12; 701/99; 702/45; 702/138

(58) Field of Classification Search
None
See application file for complete search history.

(56) References Cited

To view the complete listing of prior art documents cited during the proceeding for Reexamination Control Number 90/009,941, please refer to the USPTO's public Patent Application Information Retrieval (PAIR) system under the Display References tab.

*Primary Examiner* — Stephen Ralis

(57) ABSTRACT

The Pressure Protection Manager comprises an apparatus and method for determining and documenting overpressure protection due to causes of overpressure associated with equipment and pressure relief devices used in industries such as, for example, process plants having process fluids. The apparatus is used in association with a computer system having a memory device, a processing device, and a program in communication with the processing device and memory device program, the processing device performing tasks required by the program and the computer system further having input and output devices, the memory device comprises: a relational database structure, the relational database structure comprising an equipment database, a pressure relief devices database, a linker database communicating with the pressure relief devices database and the equipment database, and a causes of overpressure database communicating with the equipment database.

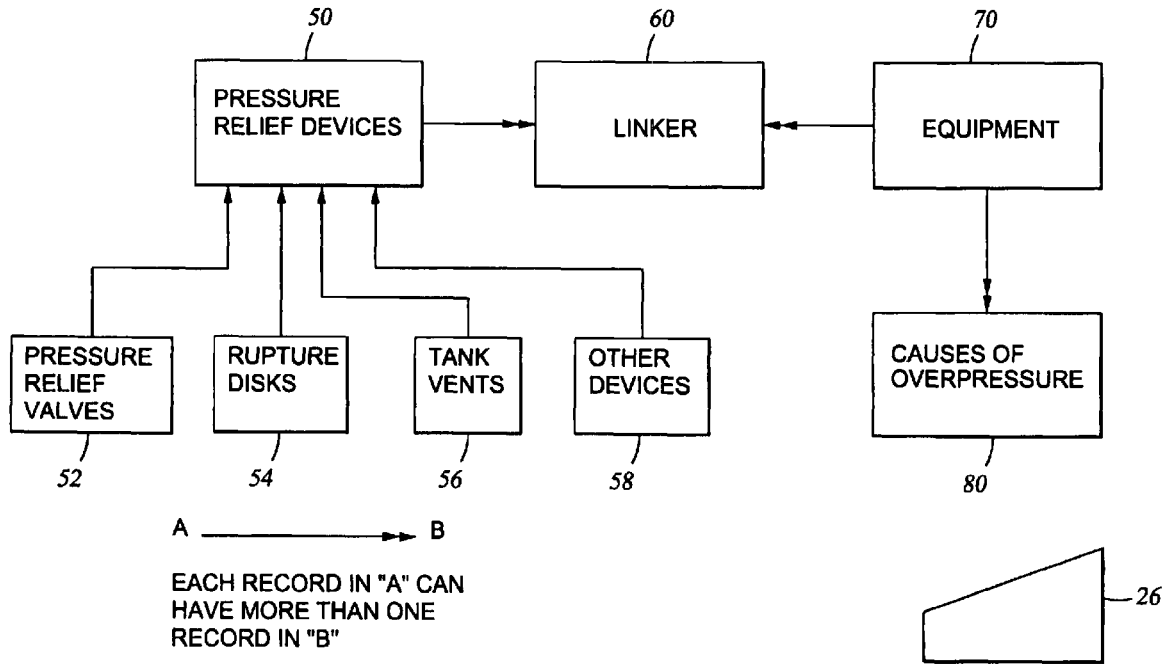

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 6-7 and 12-14 were previously cancelled.
Claims 1-5, 8-11 and 15-31 are cancelled.

\* \* \* \* \*